(12) United States Patent
Zheng

(10) Patent No.: US 7,979,024 B2
(45) Date of Patent: Jul. 12, 2011

(54) SYSTEMS AND METHODS FOR SATELLITE FORWARD LINK TRANSMIT DIVERSITY USING ORTHAGONAL SPACE CODING

(75) Inventor: Dunmin Zheng, Vienna, VA (US)

(73) Assignee: ATC Technologies, LLC, Reston, VA (US)

( * ) Notice: Subject to any disclaimer, the term of this patent is extended or adjusted under 35 U.S.C. 154(b) by 1211 days.

(21) Appl. No.: 11/624,495

(22) Filed: Jan. 18, 2007

(65) Prior Publication Data

US 2007/0184849 A1    Aug. 9, 2007

Related U.S. Application Data

(60) Provisional application No. 60/760,432, filed on Jan. 20, 2006.

(51) Int. Cl.
*H04B 7/14* (2006.01)
*H04W 24/00* (2009.01)

(52) U.S. Cl. ...................... 455/25; 455/456.1

(58) Field of Classification Search .............. 455/404.2, 455/427, 440, 456.1, 12.1, 13.3, 521, 63.4
See application file for complete search history.

(56) References Cited

U.S. PATENT DOCUMENTS

| | | | |
|---|---|---|---|
| 4,901,307 A | 2/1990 | Gilhousen et al. | |
| 5,073,900 A | 12/1991 | Mallinckrodt | |
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |

(Continued)

FOREIGN PATENT DOCUMENTS

EP    0 506 255 A2    9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.
Ayyagari et al., "A satellite-augmented cellular network concept", *Wireless Networks*, Vo. 4, 1998, pp. 189-198.
International Search Report and Written Opinion for PCT/US2007/001465; date of mailing Jul. 3, 2007.
Tirkkonen et al. "Complex Space-Time Block Codes for Four Tx Antennas" *IEEE Globecom Telcom Conference* 2:1005-1009 (2000).

*Primary Examiner* — Lester Kincaid
*Assistant Examiner* — Joel Ajayi
(74) *Attorney, Agent, or Firm* — Myers Bigel Sibley & Sajovec

(57) ABSTRACT

Methods of transmitting communications signals from a satellite to a wireless terminal include determining a location of the wireless terminal, selecting a plurality of antenna feed elements at the satellite in response to the determined location of the wireless terminal, block coding a plurality of symbols into a number of transmit streams equal to the number of selected antenna feed elements, and transmitting the transmit streams over the selected plurality of antenna feed elements. Block coding the plurality of symbols may include spacecode, space-time and/or space-frequency encoding the plurality of symbols. Related satellites, satellite gateways and satellite communications systems are also disclosed.

64 Claims, 10 Drawing Sheets

U.S. PATENT DOCUMENTS

| | | | |
|---|---|---|---|
| 5,761,605 | A | 6/1998 | Tawil et al. |
| 5,765,098 | A | 6/1998 | Bella |
| 5,812,947 | A | 9/1998 | Dent |
| 5,832,379 | A | 11/1998 | Mallinckrodt |
| 5,835,857 | A | 11/1998 | Otten |
| 5,848,060 | A | 12/1998 | Dent |
| 5,852,721 | A | 12/1998 | Dillon et al. |
| 5,878,329 | A | 3/1999 | Mallinckrodt |
| 5,884,142 | A | 3/1999 | Wiedeman et al. |
| 5,907,541 | A | 5/1999 | Fairholm et al. |
| 5,926,758 | A | 7/1999 | Grybos et al. |
| 5,937,332 | A | 8/1999 | Karabinis |
| 5,940,753 | A | 8/1999 | Mallinckrodt |
| 5,991,345 | A | 11/1999 | Ramasastry |
| 5,995,832 | A | 11/1999 | Mallinckrodt |
| 6,011,951 | A | 1/2000 | King et al. |
| 6,023,605 | A | 2/2000 | Sasaki et al. |
| 6,052,560 | A | 4/2000 | Karabinis |
| 6,052,586 | A | 4/2000 | Karabinis |
| 6,067,442 | A | 5/2000 | Wiedeman et al. |
| 6,072,430 | A | 6/2000 | Wyrwas et al. |
| 6,085,094 | A | 7/2000 | Vasudevan et al. |
| 6,091,933 | A | 7/2000 | Sherman et al. |
| 6,097,752 | A | 8/2000 | Wiedeman et al. |
| 6,101,385 | A | 8/2000 | Monte et al. |
| 6,108,561 | A | 8/2000 | Mallinckrodt |
| 6,134,437 | A | 10/2000 | Karabinis et al. |
| 6,157,811 | A | 12/2000 | Dent |
| 6,157,834 | A | 12/2000 | Helm et al. |
| 6,160,994 | A | 12/2000 | Wiedeman |
| 6,169,878 | B1 | 1/2001 | Tawil et al. |
| 6,198,730 | B1 | 3/2001 | Hogberg et al. |
| 6,198,921 | B1 | 3/2001 | Youssefzadeh et al. |
| 6,201,967 | B1 | 3/2001 | Goerke |
| 6,233,463 | B1 | 5/2001 | Wiedeman et al. |
| 6,240,124 | B1 | 5/2001 | Wiedeman et al. |
| 6,253,080 | B1 | 6/2001 | Wiedeman et al. |
| 6,256,497 | B1 | 7/2001 | Chambers |
| 6,314,269 | B1 * | 11/2001 | Hart et al. ............... 455/12.1 |
| 6,324,405 | B1 | 11/2001 | Young et al. |
| 6,339,707 | B1 | 1/2002 | Wainfan et al. |
| 6,418,147 | B1 | 7/2002 | Wiedeman |
| 6,449,461 | B1 | 9/2002 | Otten |
| 6,522,865 | B1 | 2/2003 | Otten |
| 6,628,919 | B1 | 9/2003 | Curello et al. |
| 6,684,057 | B2 | 1/2004 | Karabinis |
| 6,735,437 | B2 | 5/2004 | Mayfield et al. |
| 6,775,251 | B1 | 8/2004 | Wiedeman et al. |
| 6,785,543 | B2 | 8/2004 | Karabinis |
| 6,856,787 | B2 | 2/2005 | Karabinis |
| 6,859,652 | B2 | 2/2005 | Karabinis et al. |
| 6,879,829 | B2 | 4/2005 | Dutta et al. |
| 6,892,068 | B2 | 5/2005 | Karabinis et al. |
| 6,937,857 | B2 | 8/2005 | Karabinis |
| 6,975,837 | B1 | 12/2005 | Santoru |
| 6,999,720 | B2 | 2/2006 | Karabinis |
| 7,006,789 | B2 | 2/2006 | Karabinis et al. |
| 7,031,702 | B2 | 4/2006 | Karabinis et al. |
| 7,039,400 | B2 | 5/2006 | Karabinis et al. |
| 7,062,267 | B2 | 6/2006 | Karabinis |
| 7,092,708 | B2 | 8/2006 | Karabinis |
| 7,113,743 | B2 | 9/2006 | Karabinis |
| 7,113,778 | B2 | 9/2006 | Karabinis |
| 7,486,747 | B1 * | 2/2009 | Bagley et al. ............ 375/324 |
| 2002/0122408 | A1 | 9/2002 | Mullins |
| 2002/0146979 | A1 | 10/2002 | Regulinski et al. |
| 2002/0177465 | A1 | 11/2002 | Robinett |
| 2003/0003815 | A1 | 1/2003 | Yamada |
| 2003/0022625 | A1 | 1/2003 | Otten et al. |
| 2003/0054762 | A1 | 3/2003 | Karabinis |
| 2003/0149986 | A1 | 8/2003 | Mayfield et al. |
| 2003/0153308 | A1 | 8/2003 | Karabinis |
| 2004/0042560 | A1 | 3/2004 | Ferreol et al. |
| 2004/0072539 | A1 | 4/2004 | Monte et al. |
| 2004/0102156 | A1 | 5/2004 | Loner |
| 2004/0121727 | A1 | 6/2004 | Karabinis |
| 2004/0142660 | A1 | 7/2004 | Churan |
| 2004/0192200 | A1 | 9/2004 | Karabinis |
| 2004/0192395 | A1 | 9/2004 | Karabinis |
| 2004/0203393 | A1 | 10/2004 | Chen |
| 2004/0240525 | A1 | 12/2004 | Karabinis et al. |
| 2005/0013352 | A1 | 1/2005 | Hottinen |
| 2005/0026606 | A1 | 2/2005 | Karabinis |
| 2005/0037749 | A1 | 2/2005 | Karabinis et al. |
| 2005/0041619 | A1 | 2/2005 | Karabinis et al. |
| 2005/0079816 | A1 | 4/2005 | Singh et al. |
| 2005/0090256 | A1 | 4/2005 | Dutta |
| 2005/0118948 | A1 | 6/2005 | Karabinis et al. |
| 2005/0136836 | A1 | 6/2005 | Karabinis et al. |
| 2005/0164700 | A1 | 7/2005 | Karabinis |
| 2005/0164701 | A1 | 7/2005 | Karabinis et al. |
| 2005/0170834 | A1 | 8/2005 | Dutta et al. |
| 2005/0181786 | A1 | 8/2005 | Karabinis et al. |
| 2005/0201449 | A1 | 9/2005 | Churan |
| 2005/0208890 | A1 | 9/2005 | Karabinis |
| 2005/0221757 | A1 | 10/2005 | Karabinis |
| 2005/0227618 | A1 | 10/2005 | Karabinis et al. |
| 2005/0239399 | A1 | 10/2005 | Karabinis |
| 2005/0239403 | A1 | 10/2005 | Karabinis |
| 2005/0239404 | A1 | 10/2005 | Karabinis |
| 2005/0239457 | A1 | 10/2005 | Levin et al. |
| 2005/0245192 | A1 | 11/2005 | Karabinis |
| 2005/0260947 | A1 | 11/2005 | Karabinis et al. |
| 2005/0260984 | A1 | 11/2005 | Karabinis |
| 2005/0265273 | A1 | 12/2005 | Karabinis et al. |
| 2005/0272369 | A1 | 12/2005 | Karabinis et al. |
| 2005/0282542 | A1 | 12/2005 | Karabinis |
| 2005/0288011 | A1 | 12/2005 | Dutta |
| 2006/0040613 | A1 | 2/2006 | Karabinis et al. |
| 2006/0040657 | A1 | 2/2006 | Karabinis et al. |
| 2006/0040659 | A1 | 2/2006 | Karabinis |
| 2006/0094352 | A1 | 5/2006 | Karabinis |
| 2006/0094420 | A1 | 5/2006 | Karabinis |
| 2006/0105707 | A1 | 5/2006 | Karabinis |
| 2006/0111041 | A1 | 5/2006 | Karabinis |
| 2006/0111056 | A1 | 5/2006 | Dutta |
| 2006/0135058 | A1 | 6/2006 | Karabinis |
| 2006/0135060 | A1 | 6/2006 | Karabinis |
| 2006/0135070 | A1 | 6/2006 | Karabinis |
| 2006/0137015 | A1 * | 6/2006 | Fahrny et al. ............ 726/26 |
| 2006/0165120 | A1 | 7/2006 | Karabinis |
| 2006/0189274 | A1 | 8/2006 | Karabinis |
| 2006/0189275 | A1 | 8/2006 | Karabinis |
| 2006/0189309 | A1 | 8/2006 | Good et al. |
| 2006/0194576 | A1 | 8/2006 | Karabinis et al. |
| 2006/0205346 | A1 | 9/2006 | Evans et al. |
| 2006/0205347 | A1 | 9/2006 | Karabinis |
| 2006/0205367 | A1 | 9/2006 | Karabinis |
| 2006/0211371 | A1 | 9/2006 | Karabinis et al. |
| 2006/0211419 | A1 | 9/2006 | Karabinis |
| 2006/0211452 | A1 | 9/2006 | Karabinis |
| 2006/0217070 | A1 | 9/2006 | Karabinis |
| 2006/0232465 | A1 | 10/2006 | Levin et al. |
| 2006/0233147 | A1 | 10/2006 | Karabinis |
| 2006/0246838 | A1 | 11/2006 | Karabinis |
| 2006/0252368 | A1 | 11/2006 | Karabinis |
| 2006/0276129 | A1 | 12/2006 | Karabinis |
| 2006/0292990 | A1 | 12/2006 | Karabinis et al. |

FOREIGN PATENT DOCUMENTS

| | | |
|---|---|---|
| EP | 0 597 255 A1 | 5/1994 |
| EP | 0 506 255 B1 | 11/1996 |
| EP | 0 748 065 A2 | 12/1996 |
| EP | 0 755 163 A2 | 1/1997 |
| EP | 0 797 319 A2 | 9/1997 |
| EP | 1 223 702 A1 | 7/2002 |
| EP | 1 523 120 A2 | 4/2005 |
| WO | WO 01/54314 A1 | 7/2001 |
| WO | WO 2004/077734 A2 | 9/2004 |
| WO | WO 2005/117288 A2 | 12/2005 |

* cited by examiner

SYSTEMS AND METHODS FOR SATELLITE FORWARD LINK TRANSMIT DIVERSITY USING ORTHOGONAL SPACE CODING

CROSS REFERENCE TO RELATED APPLICATION

This application claims the benefit of and priority to U.S. Provisional Patent Application No. 60/760,432, filed Jan. 20, 2006, the disclosure of which is hereby incorporated herein by reference as if set forth in its entirety.

FIELD OF THE INVENTION

The present invention relates to systems and methods for satellite communications. In particular, the present invention relates to systems and methods for satellite communications employing multiple antenna feed element transmit diversity systems.

BACKGROUND

Satellite communications systems and methods are widely used for radiotelephone communications. Satellite communications systems and methods generally employ at least one space-based component, such as one or more satellites, that is/are configured to wirelessly communicate with a plurality of wireless terminals.

A satellite communications system or method may utilize a single antenna beam or antenna pattern covering an entire area served by the system. Alternatively, or in combination with the above, in cellular satellite communications systems and methods, multiple beams (cells or antenna patterns) are provided, each of which can serve a substantially distinct geographic area in an overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with wireless terminals over a bidirectional communications pathway, with wireless terminal communications signals being communicated from the satellite to a wireless terminal over a downlink or forward link (also referred to as a forward service link), and from the wireless terminal to the satellite over an uplink or return link (also referred to as a return service link).

The overall design and operation of cellular satellite communications systems and methods are well known to those having skill in the art, and need not be described further herein. Moreover, as used herein, the term "wireless terminal" includes devices which include a radio frequency transceiver, such as cellular and/or satellite radiotelephones; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. As used herein, the term "wireless terminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion over one or more terrestrial and/or extraterrestrial locations. A wireless terminal also may be referred to herein as a "Customer Premises Equipment" (CPE), "radiotelephone," "radioterminal," "mobile terminal," "mobile user terminal," "user device" or simply as a "terminal". Furthermore, as used herein, the term "space-based" component includes one or more satellites and/or one or more other objects/platforms (e.g., airplanes, balloons, unmanned vehicles, space crafts, missiles, etc.) that have a trajectory above the earth at any altitude. In addition, as used herein the term "canceling" or "cancellation" as relating to interference canceling or cancellation means complete elimination of at least one component/element of the interference and/or at least a reduction of at least one component/element of the interference.

A terrestrial network that is configured to provide wireless communications by using and/or reusing at least some of the frequencies authorized for use by a satellite system can enhance the availability, efficiency and/or economic viability of the satellite system. Specifically, it is known that it may be difficult for satellite communications systems to reliably serve densely populated areas, because satellite signals may be blocked by high-rise structures and/or may not effectively penetrate into buildings. As a result, the satellite spectrum may be underutilized or unutilized in such areas. The terrestrial use and/or reuse of at least some of the satellite system frequencies can reduce or eliminate this potential problem.

Moreover, a capacity measure of an overall system, including a terrestrially-based and a space-based network, may be increased by the introduction of terrestrial frequency use/reuse of at least some of the frequencies authorized for use by the space-based network, since terrestrial frequency use/reuse may be much denser than that of a satellite-only (space-based network only) system. In fact, capacity may be enhanced where it may be most needed, i.e., in densely populated urban/industrial/commercial areas. As a result, the overall system may become more economically viable, as it may be able to serve a larger subscriber base more effectively and reliably.

One example of terrestrial reuse of satellite frequencies is described in U.S. Pat. No. 5,937,332 to Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing the effective downlink/uplink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Radioterminals for a satellite communications system or method having a terrestrial communications capability by terrestrially using and/or reusing at least some of the frequencies of a satellite frequency band that is also used, at least in part, by the radioterminals for space-based communications, wherein the radioterminals are configured to communicate terrestrially and via a space-based component by using substantially the same air interface for both terrestrial and space-based communications, may be more cost effective and/or aesthetically appealing than other alternatives. Conventional dual band/dual mode wireless terminal alternatives, such as the well known Thuraya, Iridium and/or Globalstar dual mode satellite/terrestrial wireless terminals, duplicate some components (as a result of the different frequency bands and/or air interface protocols between satellite and terrestrial communications), which may lead to increased cost, size and/or weight of the wireless terminal. See U.S. Pat. No. 6,052,560 to Karabinis, entitled Satellite System Utilizing a Plurality of Air Interface Standards and Method Employing Same.

Satellite communications systems and methods that may employ terrestrial reuse of satellite frequencies are described in U.S. Pat. No. 6,684,057 to Karabinis, entitled Systems and Methods for Terrestrial Reuse of Cellular Satellite Frequency Spectrum; and Published U.S. patent application Ser. Nos. US 2003/0054760 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; US 2003/0143949 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

Some satellite communications systems and methods may employ interference cancellation techniques to allow increased terrestrial use/reuse of satellite frequencies. For example, as described in U.S. Pat. No. 6,684,057 to Karabinis, cited above, a satellite communications frequency can be reused terrestrially by an ancillary terrestrial network even within the same satellite cell that is using the satellite communications frequency for space-based communications, using interference cancellation techniques. Moreover, the ancillary terrestrial network can use a modified range of satellite band forward link frequencies for transmission, to reduce interference with at least some out-of-band receivers. A modified range of satellite band forward link frequencies that is used by the ancillary terrestrial network can include only a subset of the satellite band forward link frequencies to provide a guard band between frequencies used by the ancillary terrestrial network and frequencies used by out-of-band receivers, can include power levels that monotonically decrease as a function of increasing/decreasing frequency and/or can include two or more contiguous slots per frame that are left unoccupied and/or are transmitted at reduced maximum power. Time division duplex operation of the ancillary terrestrial network may also be provided over at least a portion of the satellite band return link frequencies. Full or partial reverse mode operation of the ancillary terrestrial network also may be provided, where at least some of the forward link and return link frequencies are interchanged with the conventional satellite forward link and return link frequencies. See the Abstract of U.S. Pat. No. 6,684,057.

SUMMARY

Some embodiments of the invention provide methods of transmitting communications signals from a satellite to a wireless terminal. The methods include determining a location of the wireless terminal, selecting a plurality of antenna feed elements at the satellite in response to the determined location of the wireless terminal, block coding a plurality of symbols into a number of transmit streams equal to the number of selected antenna feed elements, and transmitting the transmit streams over the selected plurality of antenna feed elements.

The methods may further include demultiplexing an information signal to provide the plurality of symbols.

The methods may further include selecting a transmit frequency in response to the location of the wireless terminal, and transmitting the transmit streams may include transmitting the transmit streams over the selected transmit frequency. Determining the location of the wireless terminal may include receiving an indication of the location of the wireless terminal from the wireless terminal over a return link frequency.

Block coding the plurality of symbols may include space-code encoding the plurality of symbols. Space-code encoding the plurality of symbols may include generating a transmission matrix using the plurality of symbols and combining the transmission matrix with a plurality of pseudonoise codes to generate the transmit streams. The product of the transmission matrix and its transpose conjugate may be equal to the sum of the squares of the symbols used to construct the transmission matrix multiplied by a diagonal unity matrix.

The methods may further include generating a plurality of extended pseudonoise codes $w_L$ based on a pseudonoise code w associated with the wireless terminal. The extended pseudonoise codes $w_L$ may have a length that is m-times longer than the pseudonoise code w. The symbols are repeated m times, and a transmission matrix is constructed using the repeated symbols. Bblock coding the transmit streams may include combining the extended pseudonoise codes with the transmission matrix. The pseudonoise code w may include a Walsh code, and generating the extended pseudonoise codes may include generating extended Walsh codes.

Generating the extended Walsh codes may include constructing a matrix M from the Walsh code having the following form:

$$\begin{bmatrix} w & w & w & w \\ w & -w & w & -w \\ w & w & -w & w \\ w & w & -w & w \end{bmatrix}$$

wherein the rows of the matrix M represent the extended Walsh codes.

Selecting a plurality of feed elements at the satellite may include selecting a first feed element at a first satellite and selecting a second feed element at a second satellite, and transmitting the transmit streams over the selected plurality of feed elements may include transmitting a first of the transmit streams to the wireless terminal from the first feed element at the first satellite and transmitting a second of the transmit streams to the wireless terminal from the second feed element at the second satellite.

The methods may further include determining a difference in propagation delay between the first and second satellites and the wireless terminal, and selectively delaying the first or second transmit stream by a delay time in response to the determined difference in propagation delay.

The delay time may be selected such that signals transmitted by the first and second satellites arrive at the wireless terminal within a coherence time of a receiver in the wireless terminal.

Block coding the plurality of symbols may include space-time encoding the plurality of symbols. Space-time encoding the plurality of symbols may include generating a transmission matrix using the plurality of symbols, and transmitting the transmit streams over the selected plurality of antenna feed elements may include transmitting the transmit streams at time intervals specified by a time scheduler.

Block coding the plurality of symbols may include space-frequency encoding the plurality of symbols. Space-frequency encoding the plurality of symbols may include generating a transmission matrix using the plurality of symbols, and transmitting the transmit streams over the selected plurality of antenna feed elements may include transmitting the transmit streams over orthogonal subcarriers.

With space-code, space-time and/or space-frequency coding, the number of selected antenna feed elements may be four, and the transmission matrix may have the form:

$$\begin{bmatrix} c_1 & c_2 & c_3 & 0 \\ c_2^* & -c_1^* & 0 & c_3 \\ c_3^* & 0 & -c_1^* & -c_2 \\ 0 & c_3^* & -c_2^* & c_1 \end{bmatrix}$$

wherein $c_1$, $c_2$ and $C_3$ represent the plurality of symbols.

Some embodiments of the invention provide a satellite configured to transmit communications signals to a wireless terminal. The satellite includes an antenna including a plurality of feed elements and a controller configured to determine a location of the wireless terminal and configured to select a plurality of the antenna feed elements in response to the determined location of the wireless terminal and configured to block code a plurality of symbols into a number of transmit streams equal to the number of selected antenna feed elements. The satellite further includes a transmitter configured to transmit the transmit streams over the selected plurality of antenna feed elements.

The controller may be configured to block code the plurality of symbols by space-code, space-time and/or space-frequency encoding the plurality of symbols according to any of the above-described embodiments.

According to other embodiments, a satellite gateway is provided that is configured to transmit communications signals to a wireless terminal via a satellite including an antenna having a plurality of feed elements. The satellite gateway includes a controller configured to determine a location of the wireless terminal and configured to select a plurality of the antenna feed elements in response to the determined location of the wireless terminal and configured to block code a plurality of symbols into a number of transmit streams equal to the number of selected antenna feed elements, and a transmitter configured to transmit the transmit streams to the satellite for transmission over the selected plurality of antenna feed elements.

The controller may be configured to block code the plurality of symbols by space-code, space-time and/or space-frequency encoding the plurality of symbols.

The satellite may include a first satellite, and the controller may be further configured to select a first feed element at the first satellite and to select a second feed element at a second satellite. The transmitter may be further configured to transmit a first of the transmit streams to the first satellite for transmission to the wireless terminal from the first feed element at the first satellite and to transmit a second of the transmit streams to the second satellite for transmission to the wireless terminal from the second feed element at the second satellite.

The controller may be further configured to determine a difference in propagation delay between the first and second satellites and the wireless terminal, and to selectively delay the first or second transmit stream by a delay time in response to the determined difference in propagation delay.

A satellite communications system may be provided according to still other embodiments of the invention. The satellite communications system may include a satellite including an antenna having a plurality of antenna feed elements, and a satellite gateway. The satellite gateway includes a controller configured to determine a location of a wireless terminal within a geographic footprint of the satellite, configured to select a plurality of the antenna feed elements in response to the determined location of the wireless terminal, and configured to block code a plurality of symbols into a number of transmit streams equal to the number of selected antenna feed elements, and a transmitter configured to transmit the transmit streams to the satellite for transmission over the selected plurality of antenna feed elements.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 9:
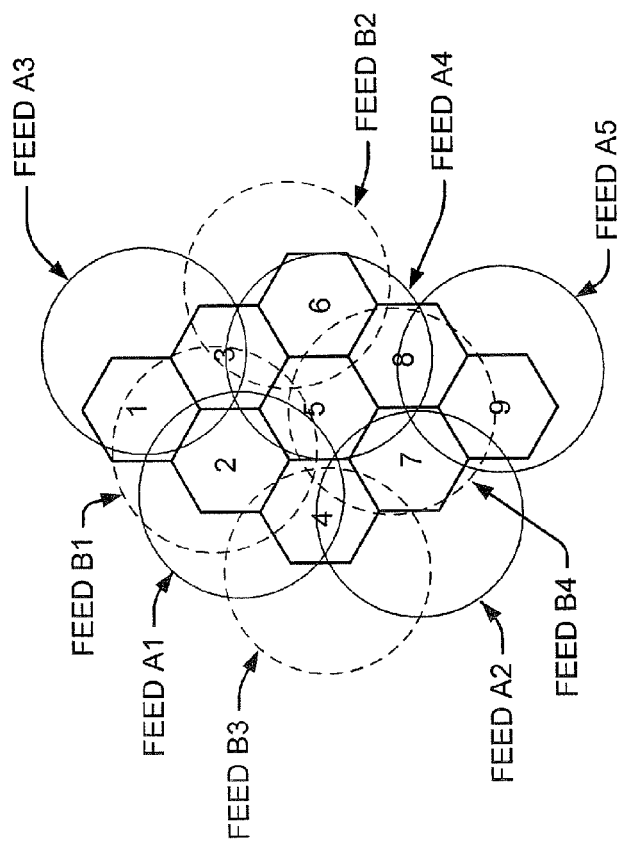
FIG. 9 is a schematic diagram illustrating a portion of satellite antenna footprints superimposed on a plurality of frequency reuse cells in two cellular satellite transmission systems.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic storage devices.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Moreover, as used herein, "substantially the same" band means that the bands substantially overlap, but that there may be some areas of non-overlap, for example at the band ends. "Substantially the same" air interface(s) means that the air interfaces are similar but need not be identical. Some changes may be made to one air interface (i.e., a satellite air interface) relative to another (i.e., a terrestrial air interface) to account for different characteristics that may exist between the terrestrial and satellite communications environments. For example, a different vocoder rate may be used for satellite communications compared to the vocoder rate that may be used for terrestrial communications (i.e., for terrestrial communications, voice may be compressed ("vocoded") to approximately 9 to 13 kbps, whereas for satellite communications a vocoder rate of 2 to 4 kbps, for example, may be used); a different forward error correction coding, different interleaving depth, and/or different spread-spectrum codes may also be used, for example, for satellite communications compared to the coding, interleaving depth, and/or spread spectrum codes (i.e., Walsh codes, long codes, and/or frequency hopping codes) that may be used for terrestrial communications.

Beam-forming techniques have been applied to many modern mobile satellite systems (MSS). With multiple transmitting and receiving antenna feed elements, a satellite beam-former may form a plurality of service area spot-beams (or cells) in the forward link and the reverse link by using advanced antenna array signal processing. An important goal of beam-forming is to increase the average signal to noise and/or signal to interference ratio of a link by focusing energy into desired directions in either the forward link or the reverse link. By estimating the response to each antenna element to a given user or a given location, and possible interference signals, a satellite/gateway can combine the elements with weights obtained as a function of each element's response to improve the average desired signal and/or to reduce other components, such as noise, interference or both. The spot-beams may be, for example, either fixed to an area or adaptive to particular users and/or interference environments depending, for example, on application scenarios and/or design considerations.

The primary components of a satellite beam-former are a beam-forming algorithm and a calibration scheme. The accuracy of calibration may be important for the performance of a beam-forming algorithm. Different calibration approaches are typically employed on the forward link and the reverse link. The reverse link generally relies on ground calibration stations that transmit a priori known calibration signals, or on pilot signals received from users, to form spot-beams. The forward link typically uses a closed-loop beam-forming scheme that uses a number of receiving ground calibration stations. An open-loop solution for forward link satellite beam-forming has proven to be difficult to implement.

One alternative to forward link closed-loop calibration station based beam-forming may be space-time coding (STC) with Multiple Inputs-Multiple Outputs (MIMO). While the intelligence of antenna array processing traditionally focuses on the optimal weight selection rather than in the coding side, the development of space-time codes is transforming this view. The space-time coding described in V. Tarokh, N. Seshadri, and A. R. Calderbank, "Space-Time Codes for High Data Rate Wireless Conmmunication: Performance Criterion and Code Construction," *IEEE Transaction on Information Theory*, vol. 44, pp. 744-765, March 1998 and V. Tarokh, H. Jafarkhani, and A. R. Calderbank, "Space-time block codes from orthogonal designs," *IEEE Transaction on Information Theory*, vol. 45, pp. 1456-1467 May 1999 can be categorized in two types: 1) space-time trellis coding (STTC), and 2) space-time block coding (STBC). The space-time trellis coding jointly exploits trellis coding, modulation design, transmit diversity and vector channel modeling to develop a signaling structure that may simultaneously yield both coding gain and diversity gain in a flat fading channel. STC with MIMO can provide joint transmit-receive diversity gain as well as array gain upon coherent combining of the antenna elements. Space-time trellis codes may perform extremely well at the cost of complexity. The complexity of space-time trellis codes can become exponential as the number of transmitter and/or receiver antennas increases. Intrigued by the issue of decoding complexity of STTC, space-time block coding was proposed with a simple encoding/decoding scheme that yields maximal diversity gain, but no trellis coding gain. See V. Tarokh, H. Jafarkhani, and A. R. Calderbank, "Space-time block codes from orthogonal designs," *IEEE Transaction on Information Theory*, vol. 45, pp. 1456-1467, May 1999.

A space-time block coding based on a complex orthogonal design for two transmit antennas was presented in S. Alamouti, "A simple transmit diversity technique for wireless communications," *IEEE Journal on Selected Areas in Communications*, vol. 16, pp. 1451-1458, October 1998, which provides diversity gain with simple linear processing at a user terminal. Another alternative to the calibration station based closed-loop approach may be a closed-loop approach relying on CPE rather than extra calibration stations. However, obtaining efficient and robust feedback from CPE has been challenging.

Some embodiments of the present invention provide an orthogonal space-time (and/or code and/or frequency) block code based transmit diversity scheme in an open-loop mode for satellite forward link communications. In the open-loop mode, the satellite communications system exploits orthogonal space-time block coding with multiple feed elements for forward link transmission to provide diversity gain, for example, for fading channel scenarios.

Embodiments of the invention provide systems and/or methods for satellite communications employing multiple antenna feed element transmit diversity and beamforming systems. The systems may use pilot signals that are available for modern 3G/4G standards (cdma2000, 802.16, etc.) to estimate channels between each individual antenna feed element and an antenna of a wireless terminal. By using the channel estimates, the wireless terminal may be able to decode the space-time coded information through linear processing and provide diversity gain in the open-loop mode.

Transmit schemes according to some embodiments of the invention can be applied to many different 3G/4G air interfaces, such as cdma2000, GSM, 802.16, etc. To illustrate the principles of transmit scheme according to embodiments of the invention, a CDMA air interface is considered as an application example to define a satellite forward link system model.

Each of the satellite forward link feed elements is assumed to be channeled into several frequency bands, for example, $f_1$, $f_2$ and $f_3$. Unlike fixed beam-forming, a space-time coding transmit scheme does not form a beam by linearly combining all feeds. Instead, a space-time encoder sends different data streams to each individual feed element, and transmits the data streams from each individual feed element independently. Therefore, proper frequency planning may be done to reduce the effects of co-channel interference from frequency re-use. Though a conventional spot-beam does not exist in the space-time transmit scheme, the concept of a co-frequency zone in a spot-beam can still be applied for frequency planning based on location(s) of CPE. Co-channel interference from frequency re-use will be discussed below. The present discussion will consider a cdma2000 1x system operating in the $f_1$ band.

For a CDMA forward link, orthogonal Walsh codes are used to separate users along with an area of geo-location specific covering code. For K users receiving signals within a common geo-location area, the transmitted signal on a single feed antenna is $$y(t) = \left( \sum_{k=1}^{K} \sqrt{P_k}\, b_k(t) s_k(t) + \sqrt{P_p}\, p(t) \right) a(\theta, \varphi) q(t) \qquad (1)$$

where $b_k(t)$ and $s_k(t)$ are the $k^{th}$ user's information bit and unique Walsh spreading sequence, respectively, with M chips/bit; $p(t)$ is the Walsh code assigned to the pilot channel for the antenna, $P_k$ and $P_p$ are the transmit power to the $k^{th}$ users and transmit power of the pilot signal respectively, $a(\theta,\phi)$ is the feed antenna pattern, and $q(t)$ is the covering code for the common geo-location area of interest.

For the $k^{th}$ user with a single antenna, the received signal is given by $$r_k(t) = \beta_k(t)y(t) + n(t) \quad (2)$$
$$= \beta_k(t)a(\theta_k, \varphi_k)\left(\sum_{k=1}^{K}\sqrt{P_k}\,b_k(t)s_k(t) + \sqrt{P_p}\,p(t)\right)q(t) + n(t)$$
$$= h_k(t)\left(\sum_{k=1}^{K}\sqrt{P_k}\,b_k(t)s_k(t) + \sqrt{P_p}\,p(t)\right)q(t) + n(t)$$

where $$\beta_k(t) = \rho_k \exp\{j(2\pi f_k t + \psi_k)\} \quad (3)$$

$\rho_k$ is the forward link path gain for the $k^{th}$ user, $f_k$ is the Doppler shift, $\Psi_k$ is a fixed phase shift for the $k^{th}$ user, $n(t)$ is thermal noise and all other interference, and $$h_k(t) = \beta_k(t)a(\theta_k,\phi_k) \quad (4)$$

is the complex satellite channel response including the transmit feed antenna pattern.

If despreading is performed on the received signal by correlating the received signal with the Walsh chip waveform after uncovering during the $i^{th}$ symbol interval of $T_s$, the decision statistic can be written as $$x_k[i] = \int_{(i-1)T_s}^{iT_s} r_k(t)q^*(t)s_k(t)dt \quad (5)$$
$$= \sqrt{P_k}\,h_k[i]b_k[i] + n[i]$$

where $h_k[i]$ represents the cumulative effect of the channel response $h_k(t)$ over the $i^{th}$ symbol interval, and $b_k[i]$ is the $i^{th}$ symbol for the $k^{th}$ user.

Note that the Walsh codes assigned to different users are assumed to be orthogonal and to repeat M chips every symbol time $T_s$ to derive the decision statistic in Equation (5).

The estimate of the effective channel response $\hat{h}_k[i]$ can be obtained by using the pilot channel though integration. With the channel estimate $\hat{h}_k[i]$, the information symbol $\hat{b}_k[i]$ can be recovered by $$\hat{b}_k[i] = f(x_k[i]\hat{h}^*_k[i])$$

where $f(\cdot)$ is a decision function depending on the modulation scheme of transmitted symbol. For a coded system, $x_k[i]\hat{h}^*_k[i]$ may be used directly as a symbol metric. The above formulation is derived based on single feed element transmission and a single receive antenna for the end user. It is realistic to assume an end user has only one antenna. However, as a satellite may have many feed elements, for a given user's location, signals transmitted from at least a few of the feed elements can be received at a reasonable level at the user receiver. To achieve transmit diversity over the satellite, a transmit scheme according to some embodiments of the invention takes advantage of multiple antenna feed elements to realize diversity gain and/or beamforming gain.

In a general system model, a transmit system includes M antenna feed elements and a CPE has N receiving antennas. Then, the received signal is given by $$X = HWC + N \in C^{N \times Q} \quad (6)$$

where H is the N×M channel matrix represented by $$H = \begin{bmatrix} h_{1,1} & h_{2,1} & \cdots & h_{M,1} \\ h_{1,2} & h_{2,2} & \cdots & h_{M,2} \\ \vdots & \vdots & & \vdots \\ h_{1,N} & h_{2,N} & \cdots & h_{M,N} \end{bmatrix} \in C^{N \times M} \quad (7)$$

and is assumed constant over Q symbols, C is the M×Q transmission waveform matrix, N is the N×Q receiver noise plus interference matrix, and W is a weighting matrix with dimension of M×M.

For a satellite system, the conventional method for the forward link transmit path is to form a spot-beam covering a certain geo-location area by linearly combining a group of transmit feed antenna elements. All of the forward link signals may be transmitted though the formed spot-beam. The fixed spot beam-forming approach requires closed-loop calibrations that use a number of calibration stations across the coverage area. Unlike the fixed spot-beam approach, transmit schemes according to some embodiments of the invention may not require dedicated calibration stations. According to some embodiments of the invention, a traffic data stream is partitioned into a few sub-streams either in time or frequency (for Orthogonal Frequency Division Multiple Access (OFDMA)), or both. The data sub-streams are transmitted directly over selected feed antennas according to certain transmission metrics (coding) at different time epochs (time coding, for Time Division Multiple Access (TDMA), OFDMA) or difference code functions (code spreading coding, for Code Division Multiple Access (CDMA)). On the CPE side, the received signal is a linear superposition of each data sub-stream, which has been distorted by the channel and perturbed by additive noise. The CPE receiver first estimates channels for each of the transmit paths with the aid of pilot signals, each of which bears a unique Walsh code (for CDMA) or frequency and time slot (for OFDMA and TDMA), then estimates each data sub-stream by coherently combining all received signal paths, and finally recovers the transmitted data stream by multiplexing estimates of all data sub-streams.

An open-loop transmit diversity system according to some embodiments of the invention may not form a spot-beam. Instead, user signals are directly transmitted from a set of selected feed elements using a space-time coding scheme. To limit inter-cell co-channel interference, as in the case of a spot-beam system, the transmit diversity system may also have proper frequency planning through frequency reuse. The concept of frequency reuse among different cells (geo-location areas) can be used for the new transmit diversity system by defining virtual cells with the user location information provided by GPS. By defining virtual cells, the frequency planning can be done in a similar way as in a fixed spot system.

Figure 1:
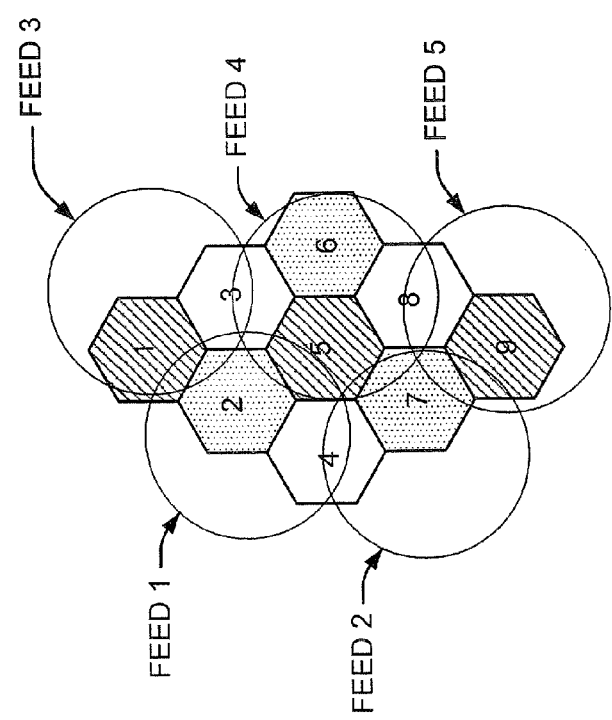
FIG. 1 is a schematic diagram illustrating a portion of a satellite antenna footprint superimposed on a plurality of frequency reuse cells in a cellular satellite transmission system.

FIG. 1 schematically illustrates en exemplary footprint of five satellite forward link feed elements that are superimposed over a virtual cell configuration, assuming a frequency reuse ratio of three, for a satellite transmit diversity system. In FIG. 1, the idealized footprints of five antenna feed elements are transposed over nine virtual cells defined by their actual physical locations within the satellite footprint. Cells 1, 5 and 9 use a first frequency, while cells 3, 4 and 8 use a second frequency and cells 2, 6 and 7 use a third frequency.

For an open-loop transmit diversity system according to some embodiments of the invention, in general, the forward link user signals are first grouped into cells according to a user's location profile which can be updated by GPS and/or other conventional techniques. Each cell is assigned to one of F frequency bands (where F is the frequency reuse ratio) according to the frequency planning scheme. For users in the same cell, a subset of M feed elements of the satellite antenna is chosen based on the order of most visible to the users in the cell. Typically, for a given cell location, only 4 or 5 feed elements may actually be visible to users in the cell. Thus, for example, in the embodiments shown in FIG. 1, feed elements 1, 2, 3 and 4 may be most visible to users in cell 2.

Figure 2A:
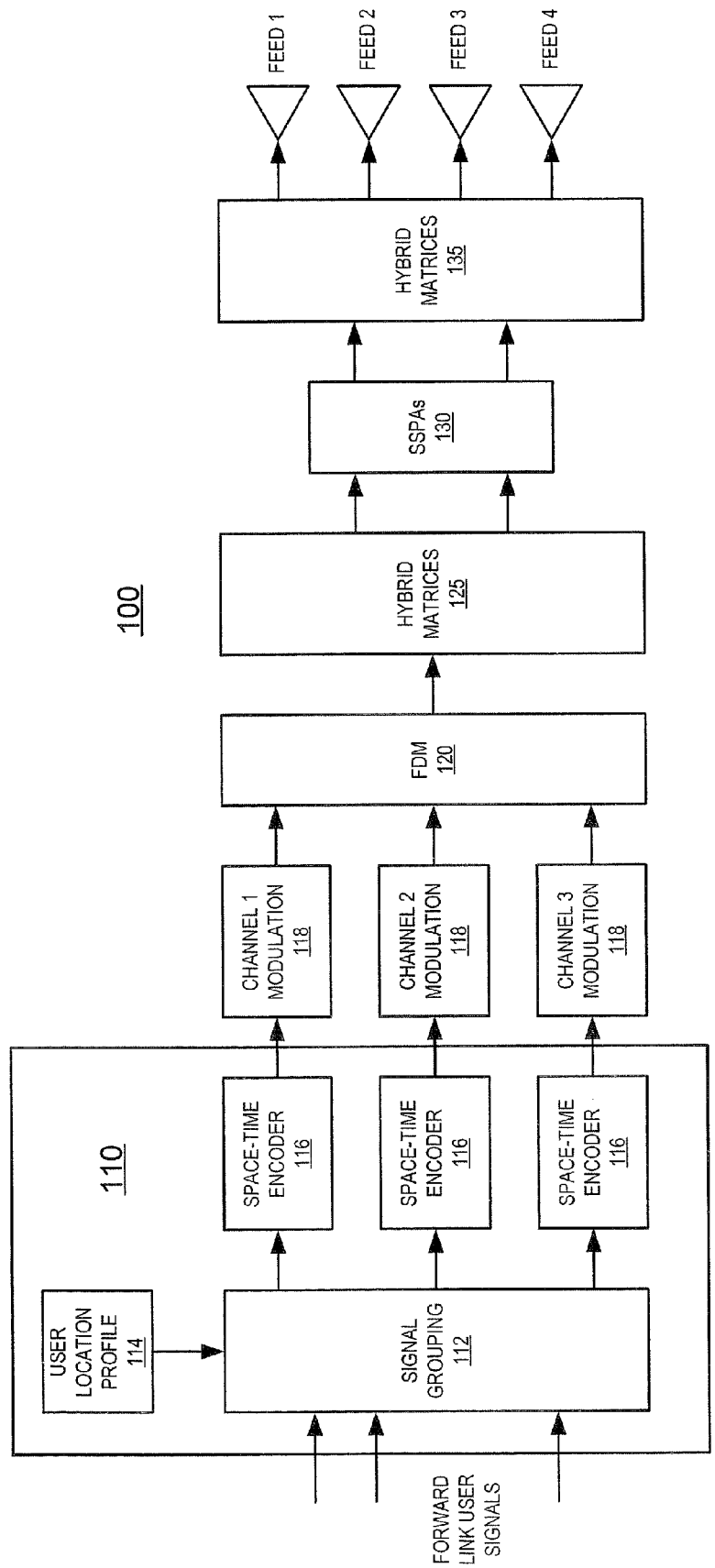
FIG. 2A is a block diagram of transmission systems and/or methods for a forward link diversity communications system according to some embodiments of the invention.

A block diagram that illustrates a satellite forward link transmitter 100 diversity systems and/or methods according to some embodiments of the invention is shown in FIG. 2A. The transmitter 100 may be implemented, for example, in a satellite and/or in a satellite gateway.

The transmitter 100 includes a controller 110 that is configured to perform certain data processing operations on data signals that are to be transmitted by the transmitter 100. For example, the controller 110 may be configured to perform encoding, interleaving, grouping, and/or other operations. In the transmitter 100, forward link user signals are grouped into N frequency bands and are associated with subgroups of feed elements (block 112) according to the locations of the users retrieved from a user location profile database 114. Space-time coding may be performed for each cell in a space/time encoder based on the frequency band by selecting the set of feed elements for efficient orthogonal transmission. The space-time coded streams are modulated by RF modulation (blocks 118 and 120) and amplified by solid state power amplifiers (SSPAs) 130, and then transmitted by each feed element Feed 1 to Feed M in parallel. In order to equalize the signal input levels applied to the individual transmit amplifiers, and therefore maintain the amplifiers within their proper signal level range, hybrid matrix amplifier configurations are commonly used onboard communication satellites. A typical hybrid matrix amplifier includes a set of N ($N=2^n$, where n is an integer) parallel amplifiers located symmetrically between two, cascaded N-input by N-output multi-port hybrid matrix devices. In a typical hybrid matrix amplifier arrangement, N individual amplifier input signals are supplied by the N outputs of the N×N Input multi-port hybrid matrix 125 and the output signals of the the N SSPAs 130 are similarly applied to the input section of the N×N Output multi-port hybrid matrix 135.

Figure 2B:
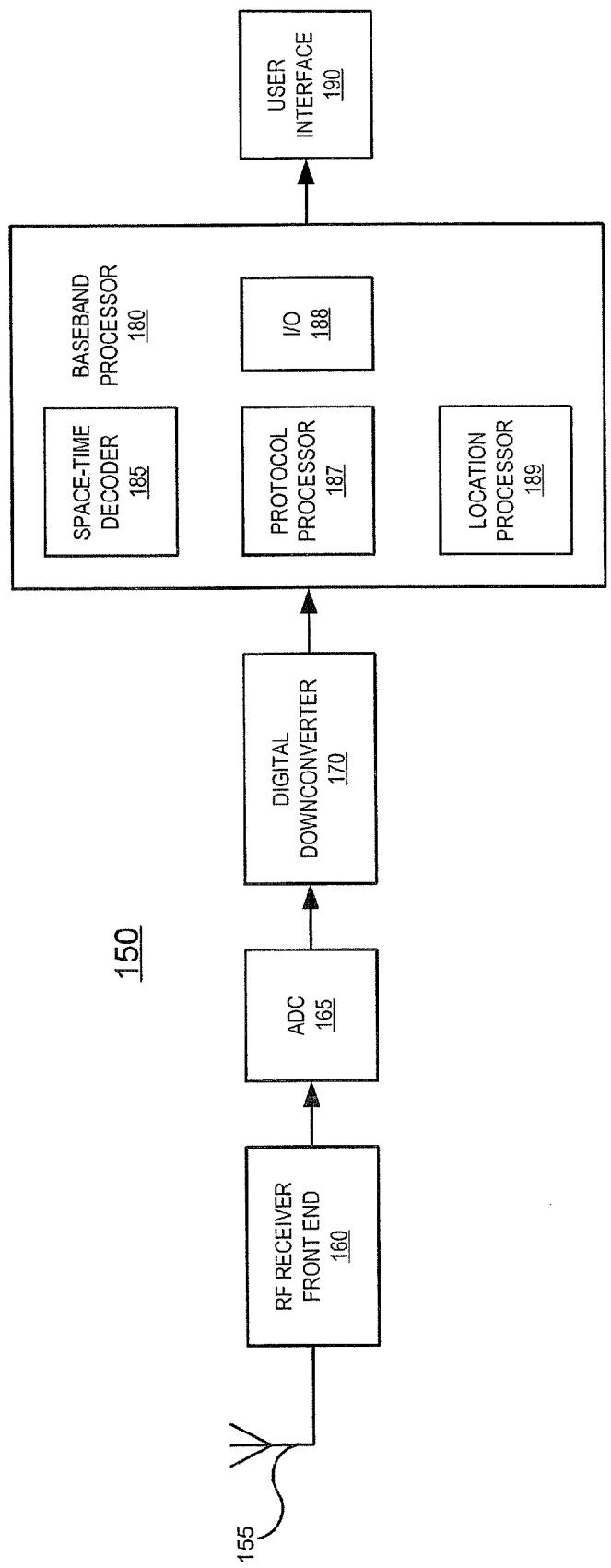
FIG. 2B is a block diagram of receiver systems and/or methods for a forward link diversity communications system according to some embodiments of the invention.

FIG. 2B illustrates a receiver 150 that may be implemented, for example, in a CPE device, such as a mobile wireless terminal. At the user end receiver 150 an antenna 155 receives a signal that is a linear combination of each data sub-stream, for example, through a MISO (multiple input and single output) channel. (While a single antenna is shown in FIG. 2 for purposes of illustration, more than one antenna may be used.) The received signal is fed to an RF receiver front end 160, which amplifies and mixes the received signal to an intermediate frequency (IF). The IF signal is then digitally down-converted to baseband via an analog-to-digital converter 165 and digital down converter 170. The digitized baseband signal is provided to a baseband processor 180 that includes a space-time decoder 185 and a protocol processor 187. The baseband processor 180 also includes an I/O block 188 that communicates with a user interface 190.

The baseband processor 180 may further include a location processor configured to obtain a current location of the receiver 150. The location processor 189 may include, for example, a GPS processor and/or other location-tracking circuitry.

The baseband signal is first processed by the space-time decoder 185, which recovers the transmitted data stream with diversity gain from multiple transmit paths. After space-time decoding, the recovered signal may be further processed by other standard physical layer components, which may include a de-interleaver and/or a channel decoder.

For the transmit system defined in Equation (6), when the channel matrix H is perfectly known at the satellite/gateway, beamforming may provide an optimal transmission scheme. However, it may be almost impossible for the satellite/gateway to have instantaneous knowledge of forward link channel information in fading channel situations, not only because of feedback overhead and accuracy, but also because of the potentially large satellite channel delay. An open-loop transmit diversity scheme may provide an effective transmission strategy in fading channel situations. Since the satellite/gateway does not have knowledge of the fading channel, the weighting matrix W defined in (6) is set to a unity matrix $I^{M \times M}$, $$W = \sqrt{\frac{P}{M}} I$$

assuming the total transmit power is constrained to P, e.g., $\|W\|^2 = P$.

For example, in some embodiments, an open-loop transmit system defined by Equation (6) has M=4 feed elements and Q=4 symbols, and N=1 receiver antenna. One transmission diversity scheme according to embodiments of the invention is to form an orthogonal transmission matrix $C^{4 \times 4}$ whose columns represent the orthogonal channels and whose rows represent the feed elements. One such transmission matrix is given by $$C = \begin{bmatrix} c_1 & c_2 & c_3 & 0 \\ c_2^* & -c_1^* & 0 & c_3 \\ c_3^* & 0 & -c_1^* & -c_2 \\ 0 & c_3^* & -c_2^* & c_1 \end{bmatrix} \quad (7)$$

where $c_1$, $c_2$ and $c_3$ represent demultiplexed complex symbols of a transmission stream for a given user. Thus, using the transmission matrix shown in Equation (7), feed element 1 transmits $c_1$ on channel/code/slot 1, $c_2$ on channel/code/slot 2, $c_3$ on channel/code/slot 3, and 0 on channel/code/slot 4. Feed element 2 transmits $c_2^*$ on channel/code/slot 1, $-c_1^*$ on channel/code/slot 2, 0 on channel/code/slot 3, and $C_3$ on channel/code/slot 4. Feed element 3 transmits $C_3^*$ on channel/code/slot 1, 0 on channel/code/slot 2, $-c_1^*$ on channel/code/slot 3 and $-C_2$ on channel/code/slot 4. Feed element 4 transmits 0 on channel/code/slot 1, $C_3^*$ on channel/code/slot 2, $-C_2^*$ on channel/code/slot 3, and $c_1$ on channel/code/slot 4.

Note that the transmission matrix C has a very important property as follows:

$$c^H c = (|c_1|^2 + |c_2|^2 + |c_3|^2) I \quad (8)$$

where $(\cdot)^H$ stands for the transpose conjugate, and I is 4×4 diagonal unity matrix. Namely, the product of the transmission matrix and its transpose conjugate is equal to the sum of the squares of the symbols used to construct the transmission matrix multiplied by a diagonal unity matrix.

For such a system, according to Equation (6), the received vector of signals can be written by $$[x_1 \quad x_2 \quad x_3 \quad x_4] = \quad (9)$$

$$\sqrt{\frac{P}{4}} [h_{1,1} \quad h_{2,1} \quad h_{3,1} \quad h_{4,1}] \begin{bmatrix} c_1 & c_2 & c_3 & 0 \\ c_2^* & -c_1^* & 0 & c_3 \\ c_3^* & 0 & -c_1^* & -c_2 \\ 0 & c_3^* & -c_2^* & c_1 \end{bmatrix} + [n_1 \quad n_2 \quad n_3 \quad n_4]$$

$$\in C^{1 \times 4}$$

where the received vector $X = [x_1 \ x_2 \ x_3 \ x_4]$ represents the received signals at time t, $t+T_s$, $t+2T_s$ and $t+3T_s$ for TDMA system, or at spreading code $w_1$, $w_2$, $w_3$ and $w_4$ for CDMA system, or at subcarrier $f_n$, $f_{n+1}$, $f_{n+2}$ and $f_{n+3}$ for an OFDMA system, and $n_1$, $n_2$, $n_3$ and $n_4$ are complex random variables representing combined receiver noise and interference.

Assuming the channel estimates of $h_{1,1}$, $h_{2,1}$, $h_{3,1}$ and $h_{4,1}$ are available, then the combining schemes for three sub-streams of desired user traffic data stream can be formed as the following decision statistics:

$$d_1 = h_{1,1}^* x_1 - h_{2,1} x_2^* - h_{3,1} x_3^* + h_{4,1}^* x_4 \quad (10)$$

$$= \sqrt{\frac{P}{4}} |h_{1,1}|^2 c_1 + \sqrt{\frac{P}{4}} h_{1,1}^* h_{2,1} c_2^* + \sqrt{\frac{P}{4}} h_{1,1}^* h_{3,1} c_3^* +$$

$$\sqrt{\frac{P}{4}} |h_{2,1}|^2 c_1 - \sqrt{\frac{P}{4}} h_{2,1} h_{1,1}^* c_2^* - \sqrt{\frac{P}{4}} h_{2,1} h_{4,1}^* c_3 +$$

$$\sqrt{\frac{P}{4}} |h_{3,1}|^2 c_1 - \sqrt{\frac{P}{4}} h_{3,1} h_{1,1}^* c_3^* - \sqrt{\frac{P}{4}} h_{3,1} h_{4,1}^* c_2 +$$

$$\sqrt{\frac{P}{4}} |h_{4,1}|^2 c_1 - \sqrt{\frac{P}{4}} h_{4,1}^* h_{2,1} c_3 - \sqrt{\frac{P}{4}} h_{4,1}^* h_{3,1} c_2 +$$

$$h_{1,1}^* n_1 - h_{2,1} n_2^* - h_{3,1} n_3^* + h_{4,1}^* n_4$$

$$= \sqrt{\frac{P}{4}} (|h_{1,1}|^2 + |h_{2,1}|^2 + |h_{3,1}|^2 + |h_{4,1}|^2) c_1 +$$

$$h_{1,1}^* n_1 - h_{2,1} n_2^* - h_{3,1} n_3^* - h_{4,1}^* n_4$$

$$d_2 = h_{2,1} x_1^* + h_{1,1}^* x_2 - h_{4,1} x_3^* - h_{3,1}^* x_4 \quad (11)$$

$$= \sqrt{\frac{P}{4}} (|h_{1,1}|^2 + |h_{2,1}|^2 + |h_{3,1}|^2 + |h_{4,1}|^2) c_2 +$$

$$h_{2,1} n_1^* + h_{1,1}^* n_2 - h_{4,1} n_3^* - h_{3,1}^* n_4$$

$$d_3 = h_{3,1} x_1^* + h_{4,1} x_2^* + h_{1,1}^* x_3 + h_{2,1}^* x_4 \quad (12)$$

$$= \sqrt{\frac{P}{4}} (|h_{1,1}|^2 + |h_{2,1}|^2 + |h_{3,1}|^2 + |h_{4,1}|^2) c_3 +$$

$$h_{3,1} n_1^* + h_{4,1} n_2^* + h_{1,1}^* n_3 + h_{2,1}^* n_4$$

The coherent combined sub-stream signals appear to have a four-fold diversity gain when channels $h_{1,1}$, $h_{2,1}$, $h_{3,1}$ and $h_{4,1}$ are perfectly estimated. For the fading channel, the combined signals are equivalent to that obtained from a four-feed maximal ratio combining receiver. The phase rotations on the interference and noise terms do not degrade the effective SNR. The combined sub-stream signals are multiplexed to obtain the original symbol stream. However, for the AGWN channel, there may be no combining gain, since the transmit system is power-limited and, on the other hand, the power of the noise term is enhanced.

1. Space (Walsh) Code Transmit Diversity Scheme for CDMA-Based Satellite System

In a CDMA satellite communications system, each user in a cell is assigned a unique pseudonoise (PN) spreading code, such as a Walsh code. A multiple feed element transmit system based on the space-time coding concept is more precisely based on space-Walsh (code) coding. In some embodiments, each user data stream is de-multiplexed into several sub-streams, and each sub-stream is transmitted using a set of extended Walsh codes across multiple feeds. The extended Walsh code is formed from the original code, so that code sharing among different users may be avoided. A transmission scheme according to some embodiments of the invention may provide multiple feed diversity on the downlink without requiring additional antennas on the receiver side, and/or without causing additional intra-cell interference and/or self interference.

Figure 3:
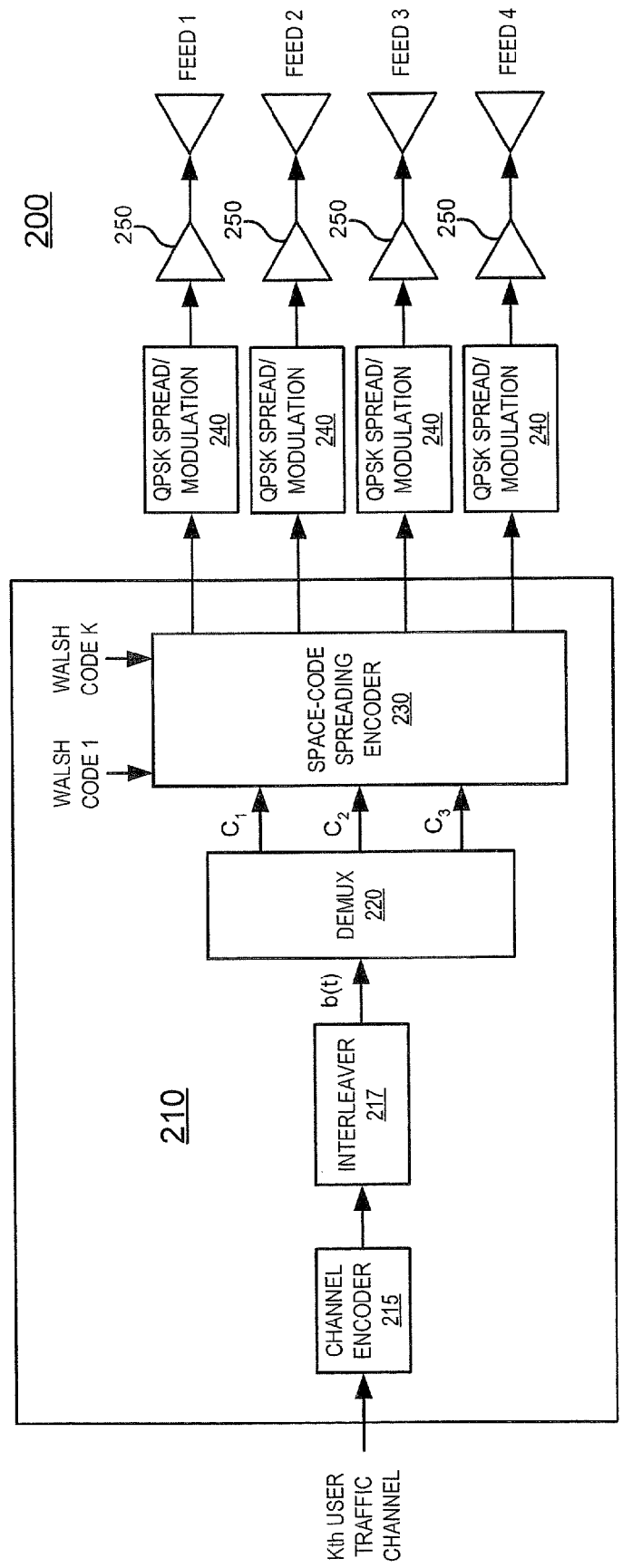
FIG. 3 is a block diagram of multiple feed space-code diversity transmitter systems and/or methods according to some embodiments of the invention.

FIG. 3 illustrates a block diagram of a multiple feed diversity transmitter 200 based on space-code coding. In the transmit diversity architecture described in Section 3, it is assumed that there are K active users in a given cell. For the embodiments given by Equation (9), four feed elements Feed 1 to Feed 4 are selected for transmission to a particular user based on the user's location profile. The transmitter 200 includes a controller 210 that receives and processes user traffic information for transmission by the transmitter 200. In particular, each user data stream is channel encoded by a channel encoder 215 and interleaved by an interleaver 217. The coded symbol stream is then de-multiplexed into three sub-streams $c_1$, $c_2$ and $C_3$ by a demultiplexer 220. The three sub-streams are fed to a space-code encoder 230 with 4 feeds and 4 extended Walsh codes. The four space-code coded signal paths are further complex spread and modulated by QPSK spreader/modulators 240, and power-amplified by power amplifiers 250 before being sent to respective feed elements Feed 1 to Feed 4 for transmission.

The space-code encoding is done in space and code. For a given extended Walsh code, three sub-streams are simultaneously transmitted from three of four feed elements. The four extended Walsh codes are formed from the original Walsh code. If the original Walsh code $s_k^L$ with length of L is assigned to a particular user k in non-diversity system, the corresponding four extended Walsh codes with length of 4 L may be given as $$\begin{bmatrix} w_{k,1}^{4L} \\ w_{k,2}^{4L} \\ w_{k,3}^{4L} \\ w_{k,4}^{4L} \end{bmatrix} = \begin{bmatrix} s_k^L & s_k^L & s_k^L & s_k^L \\ s_k^L & -s_k^L & s_k^L & -s_k^L \\ s_k^L & s_k^L & -s_k^L & -s_k^L \\ s_k^L & -s_k^L & -s_k^L & s_k^L \end{bmatrix} \quad (13)$$

With the four extended Walsh codes, a transmission diversity scheme according to some embodiments of the invention uses the orthogonal transmission C matrix whose columns represent the orthogonal Walsh codes and whose rows represent the feed elements. The orthogonality of columns of the transmission matrix may provide full diversity for the desired signal without introducing cross-feed interference, and may lead to a simple linear processing decoding algorithm at the receiver. The detailed encoding and transmission scheme is given in Table 1. For simplicity, $w_1$ is used to stand for $w_{1,k}^{4L}$, and similarly for $w_2$, $w_3$ and $w_4$.

TABLE 1

Encoding Scheme for 4 feeds Transmit Diversity

| | Walsh Code | | | |
|---|---|---|---|---|
| Feed | $w_1$ | $w_2$ | $w_3$ | $w_4$ |
| 1 | $c_1$ | $c_2$ | $c_3$ | 0 |
| 2 | $c_2$* | $-c_1$* | 0 | $c_3$ |
| 3 | $c_3$* | 0 | $-c_1$* | $-c_2$ |
| 4 | 0 | $c_3$* | $-c_2$* | $c_1$ |

The transmitted signal on Feed #can be written as $$y_1(t) = \left[ \sqrt{\frac{P}{4}} (c_1(t)w_1(t) + c_2(t)w_2(t) + c_3(t)w_3(t)) + \sum_{k=2}^{K} \sqrt{\frac{P_k}{4}} z_{1,k}(t) + \sqrt{P_{p_1}} w_{p_1}(t) \right] a_1(\theta, \varphi) q(t) \quad (14)$$

and transmitted signal on Feed #2 is $$y_2(t) = \left[\sqrt{\frac{P}{4}}\,(c_2^*(t)w_1(t) - c_1^*(t)w_2(t) + c_3(t)w_4(t)) + \sum_{k=2}^{K}\sqrt{\frac{P_k}{4}}\,z_{2,k}(t) + \sqrt{P_{p2}}\,w_{p2}(t)\right] a_2(\theta,\varphi)q(t) \quad (15)$$

similarly the transmitted signals on Feeds #3 and 4 are given respectively by $$y_3(t) = \left[\sqrt{\frac{P}{4}}\,(c_3^*(t)w_1(t) - c_1^*(t)w_3(t) - c_2(t)w_4(t)) + \sum_{k=2}^{K}\sqrt{\frac{P_k}{4}}\,z_{3,k}(t) + \sqrt{P_{p3}}\,w_{p3}(t)\right] a_3(\theta,\varphi)q(t) \quad (16)$$

$$y_4(t) = \left[\sqrt{\frac{P}{4}}\,(c_3^*(t)w_2(t) - c_2^*(t)w_3(t) + c_1(t)w_4(t)) + \sum_{k=2}^{K}\sqrt{\frac{P_k}{4}}\,z_{4,k}(t) + \sqrt{P_{p4}}\,w_{p4}(t)\right] a_4(\theta,\varphi)q(t) \quad (17)$$

where P is the total transmit power for the desired user; $c_1(t)$, $c_2(t)$ and $c_3(t)$ are the three symbol sub-streams of the desired user; $w_1(t)$, $w_2(t)$, $w_3(t)$ and $w_4(t)$ are the extended Walsh codes as described in Equation (13) for the desired user; $P_k$ is the total transmit power for the $k^{th}$ user, and $z_{1,k}(t)$, $z_{2,k}(t)$, $z_{3,k}(t)$ and $z_{4,k}(t)$ are the signals transmitted for the $k^{th}$ user at Feeds 1, 2, 3 and 4 respectively; $P_{pi}$ and $w_{pi}(t)$ are the pilot transmit power and Walsh code dedicated to the $i^{th}$ Feed; $a_i(\theta,\phi)$ is the $i^{th}$ feed pattern; and finally q(t) is the covering code for the cell.

Figure 4:
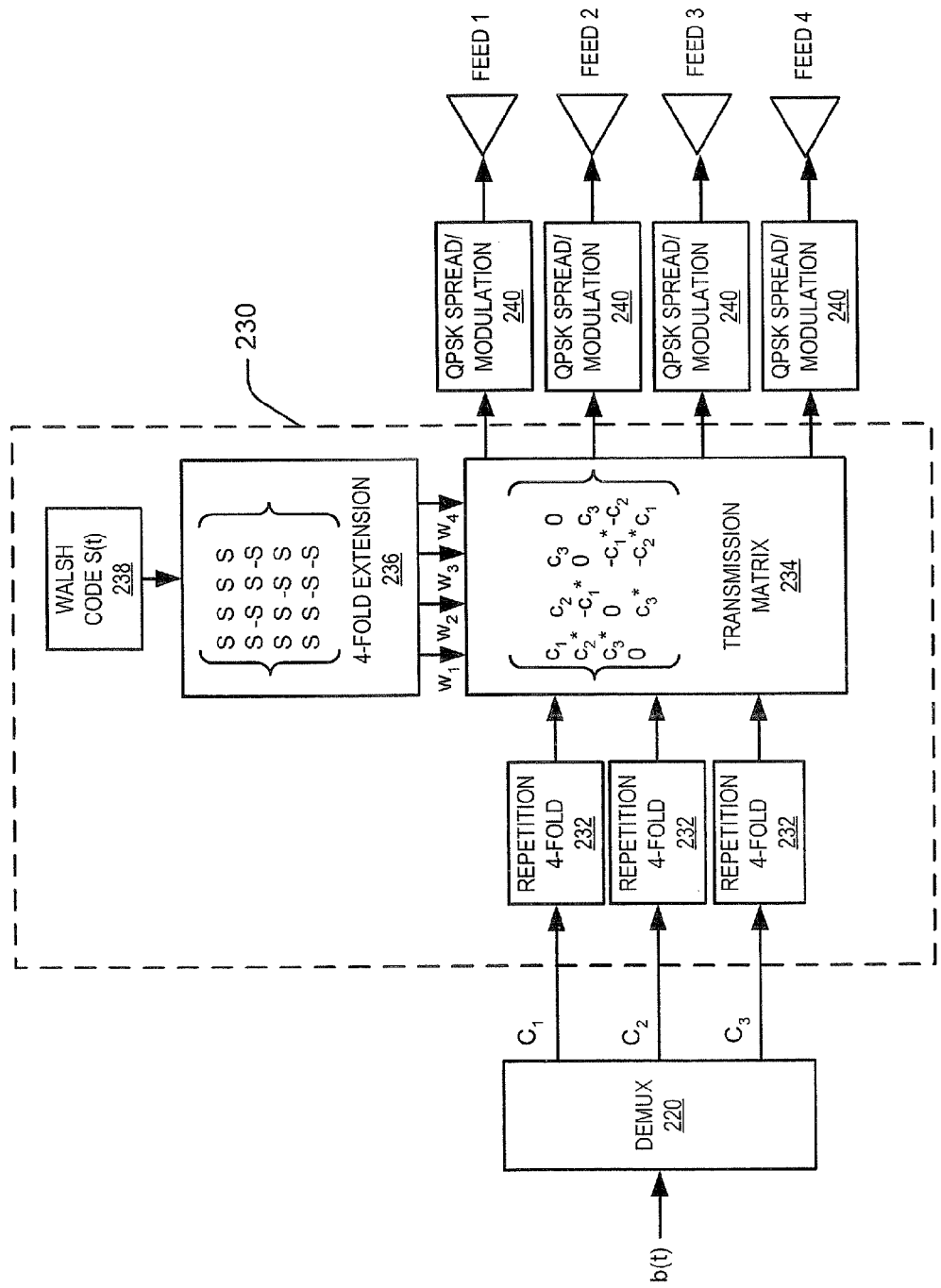
FIG. 4 is a block diagram of space-code spreading encoder systems and/or methods according to some embodiments of the invention.

A space-Walsh encoder and associated methods according to some embodiments of the invention is shown in more detail in FIG. 4. As shown therein, a space-Walsh encoder 230 receives demultiplexed symbol streams $c_1$, $c_2$ and $c_3$ from the demultiplexer 220. The symbol streams are repeated four times (block 232) and used to construct a transmission matrix 234. The Walsh code for the user in question is retrieved from a Walsh code database 238, and a set of extended Walsh codes is constructed (block 236). The symbol streams $c_1$, $c_2$ and $c_3$ are then encoded according to the transmission matrix using the extended Walsh codes to form four output data streams that are provided to the QPSK spreader/modulators 240 and transmitted via the feed elements Feed 1 to Feed 4.

The four transmitted signal paths are propagated through channels and then aggregated at the receiver. The receiver separates each sub-stream and may provide diversity gain through space-Walsh code decoding in a robust and efficient manner. The space-Walsh code transmission scheme based on the complex orthogonal design makes this possible in some embodiments.

As the four signal paths $y_1$, $y_2$, $y_3$ and $y_4$ are transmitted from Feeds 1, 2, 3 and 4 respectively, the single antenna at the desired user terminal receives a signal r(t) as follows:

$$r(t) = [\beta_{1,1}\ \beta_{2,1}\ \beta_{3,1}\ \beta_{4,1}]\begin{bmatrix} y_1(t) \\ y_2(t) \\ y_3(t) \\ y_4(t) \end{bmatrix} + n(t) \quad (18)$$

where $\beta_{1,1}$, $\beta_{2,1}$, $\beta_{3,1}$ and $\beta_{4,1}$ are the channel complex gains between 4 transmit feeds and the receive antenna respectively, n(t) represents complex thermal noise.

For a desired user located at $[\theta_1,\phi_1]$, by defining $$h_{1,1} = \beta_{1,1} a_1(\theta_1,\phi_1)$$

$$h_{2,1} = \beta_{2,1} a_2(\theta_1,\phi_1)$$

$$h_{3,1} = \beta_{3,1} a_3(\theta_1,\phi_1)$$

$$h_{4,1} = \beta_{4,1} a_4(\theta_1,\phi_1) \quad (19)$$

the following statistics are obtained, which are corresponding to the received signal vector X in (9), at the outputs of Walsh correlators with regards to $w_1$, $w_2$, $w_3$ and $w_4$:

$$\begin{aligned}x_1 &= \int_{(i-1)T_s}^{iT_s} r(t)q^*(t)w_1(t)dt \\ &= \sqrt{\frac{P}{4}}\,h_{1,1}b_1 + \sqrt{\frac{P}{4}}\,h_{2,1}b_2^* + \sqrt{\frac{P}{4}}\,h_{3,1}b_3^* + n_1 \\ x_2 &= \int_{(i-1)T_s}^{iT_s} r(t)q^*(t)w_2(t)dt \\ &= \sqrt{\frac{P}{4}}\,h_{1,1}b_2 - \sqrt{\frac{P}{4}}\,h_{2,1}b_1^* + \sqrt{\frac{P}{4}}\,h_{4,1}b_3^* + n_2 \\ x_3 &= \int_{(i-1)T_s}^{iT_s} r(t)q^*(t)w_3(t)dt \\ &= \sqrt{\frac{P}{4}}\,h_{1,1}b_3 - \sqrt{\frac{P}{4}}\,h_{3,1}b_1^* - \sqrt{\frac{P}{4}}\,h_{4,1}b_2^* + n_3 \\ x_4 &= \int_{(i-1)T_s}^{iT_s} r(t)q^*(t)w_4(t)dt \\ &= \sqrt{\frac{P}{4}}\,h_{2,1}b_3 - \sqrt{\frac{P}{4}}\,h_{3,1}b_2 + \sqrt{\frac{P}{4}}\,h_{4,1}b_1 + n_4\end{aligned} \quad (20\text{-}23)$$

where $n_1$, $n_2$, $n_3$ and $n_4$ are interference plus noise in the output of each Walsh correlator, respectively. Assuming the channel estimates of $h_{1,1}$, $h_{2,1}$, $h_{3,1}$ and $h_{4,1}$ are available, then the combining schemes for three sub-streams of desired user traffic data streams can be formed by decision statistics as given by Equations (10-12).

Figure 5:
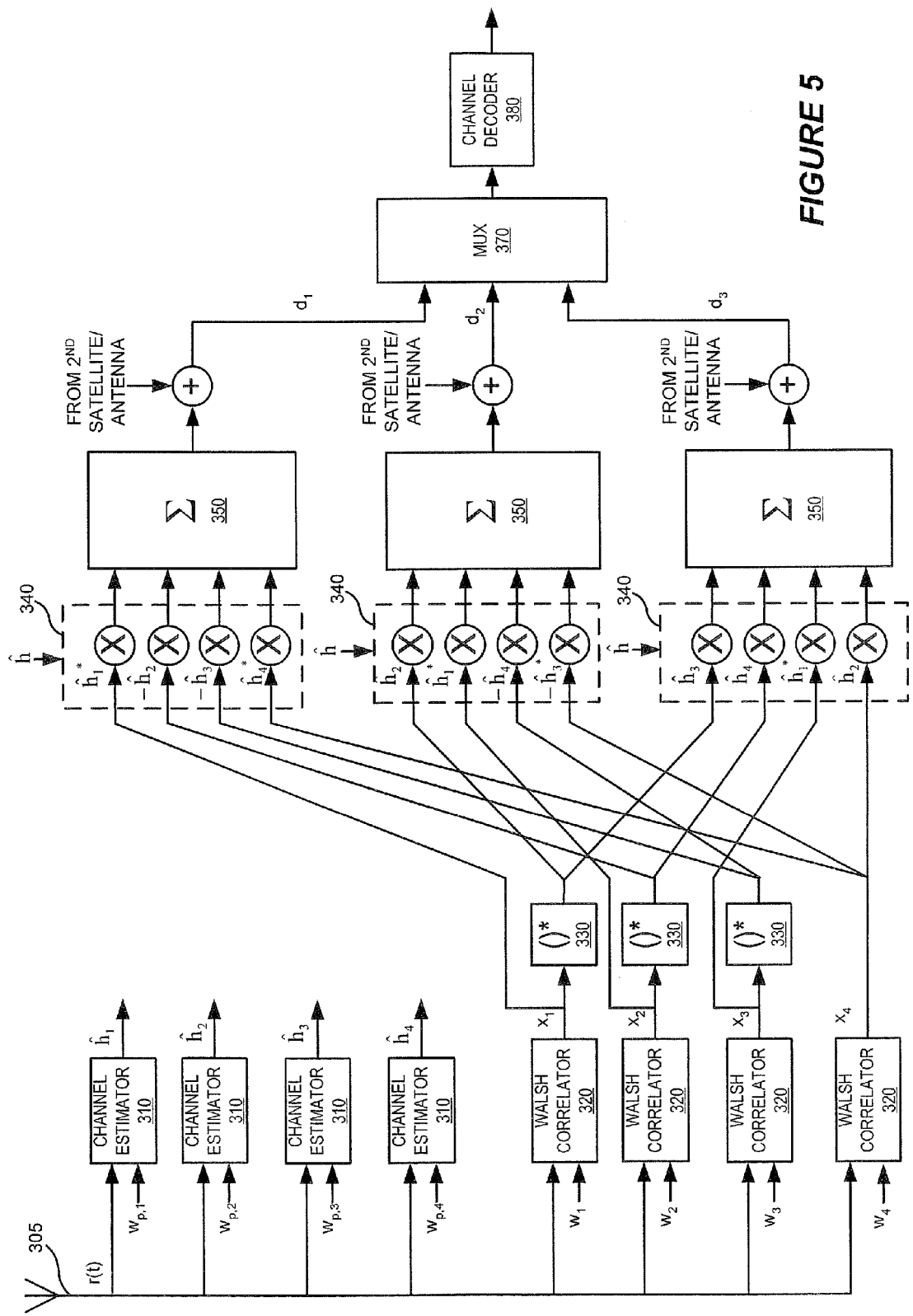
FIG. 5 is a block diagram of space-code decoder systems and/or methods according to some embodiments of the invention.

An end user diversity receiver 300 including a space-Walsh code decoder is shown in FIG. 5. As shown in FIG. 5, the transmitted signals are received at an antenna 305. Channels for each of the four transmit paths are estimated by channel estimators 310 using the pilot codes $w_{p,1}$ to $w_{p,4}$, and the received signals are despread using four Walsh correlators 320. The complex conjugates of the despread signals are obtained (block 330), and the despread complex signals $x_1$ to $x_4$ and/or the appropriate conjugates thereof are multiplied by appropriate channel estimates at multipliers 340 and summed in combiners 350 to recover the demultiplexed signals, as described above in connection with Equations (10-12). If signals from a second satellite are available, they can be combined with the signals from the first satellite at the combiners 360. The demultiplexed signals are then multiplexed to form the received signal, which is decoded by a channel decoder 380.

2. Space-Time Transmit Diversity Scheme for TDMA Based Satellite System

Figure 6:
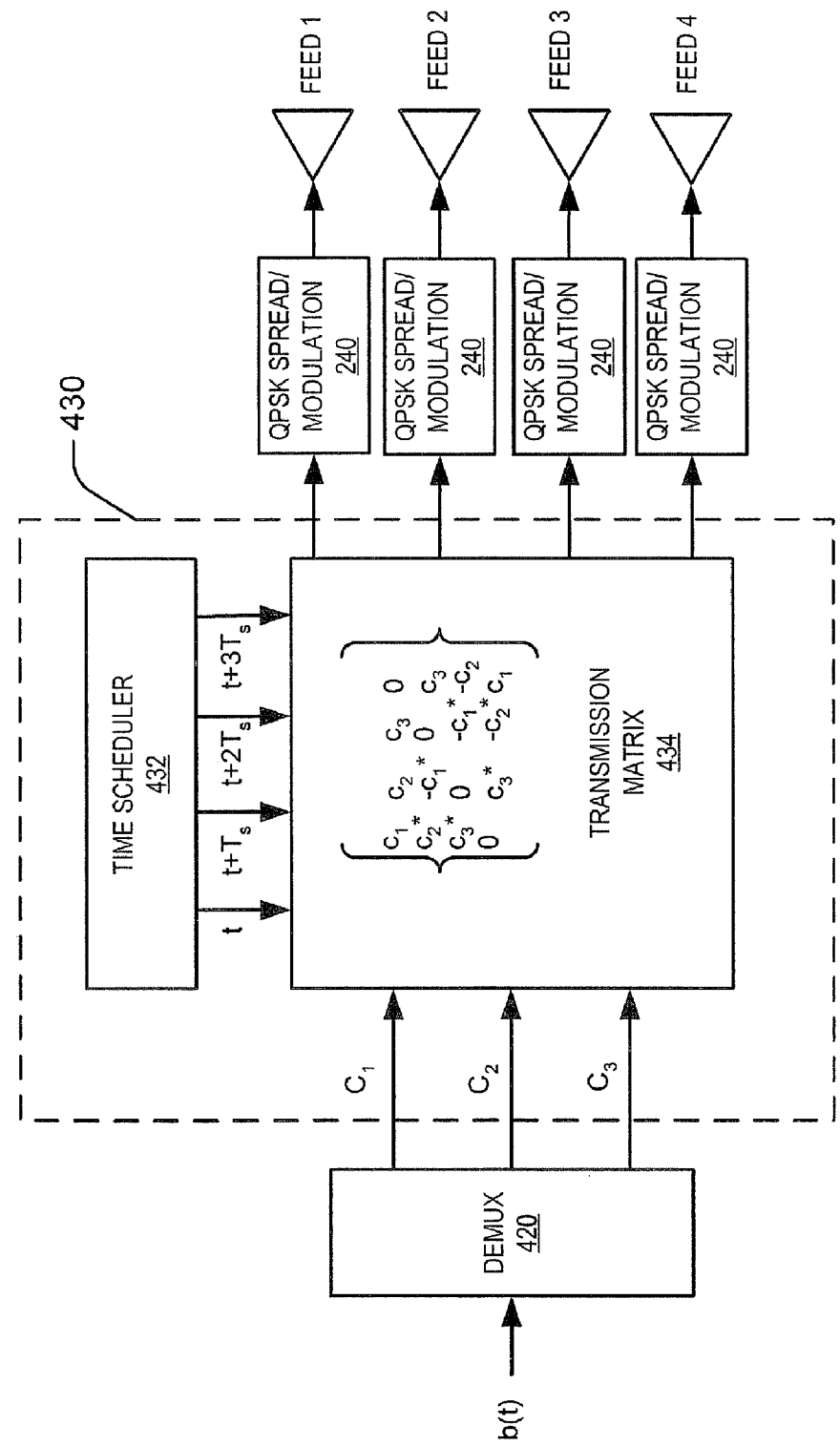
FIG. 6 is a block diagram of space-time spreading encoder systems and/or methods according to some embodiments of the invention.

For a TDMA satellite system, each user in a cell is assigned to a certain time slot. For example, for a transmit system defined by Equation (9), if a user's every three consecutive symbols are $c_1$, $c_2$ and $c_3$, the idea of space-time transmit diversity is to transmit $c_1$, $c_2$ and $c_3$ from multiple feeds for a given symbol period according to a transmission matrix. The code division in the space-Walsh code diversity system is replaced by time division in the space-time diversity system. Using the same complex orthogonal transmission matrix as in Equation (7) whose columns represent the symbol time and rows represent the feed elements, a space-time transmit diversity scheme may be provided as shown in FIG. 6, where $T_s$ is the duration of symbol. In particular, FIG. 6 illustrates a space-time encoder 430 in which the demultiplexed symbol streams c1, c2 and c3 are received from a demultiplexer 420. The symbol streams c1, c2 and c3 are used to construct a transmission matrix 434 that defines four output data streams that are transmitted over the four antenna feeds Feed 1 to Feed 4 at time intervals specified by a time scheduler 432.

On the receiver side, the baseband representation of the received signal vector can be expressed as Equation (9). The combining schemes for three symbols of the user can be formed in a similar way as that given by Equations (10-12). The coherent combined symbols provide four-fold diversity gain as in a 1Tx-4Rxs maximal ratio combining receiver. The channel estimates can be obtained from the pilot symbols that are unique for each feed.

3. Space-Frequency Transmit Diversity Scheme for OFDM(A) Based Satellite System In an OFDM-based satellite system, a user may occupy a set of orthogonal sub-carriers over a certain symbol period of time. Therefore, it is possible to have transmit diversity with space-time and/or space-frequency coding. The space-time coding transmit diversity scheme for OFDM is similar to the space-time coding transmit diversity for TDMA discussed above. The space-frequency coding transmit diversity for OFDM is a transmit scheme based on multiple transmit feeds (space) and a set of sub-carriers (frequency) coding with a symbol. The idea is to achieve diversity gain for each sub-carrier at the receiver by transmitting space-frequency coded signals from the multiple feed antennas.

Figure 7:
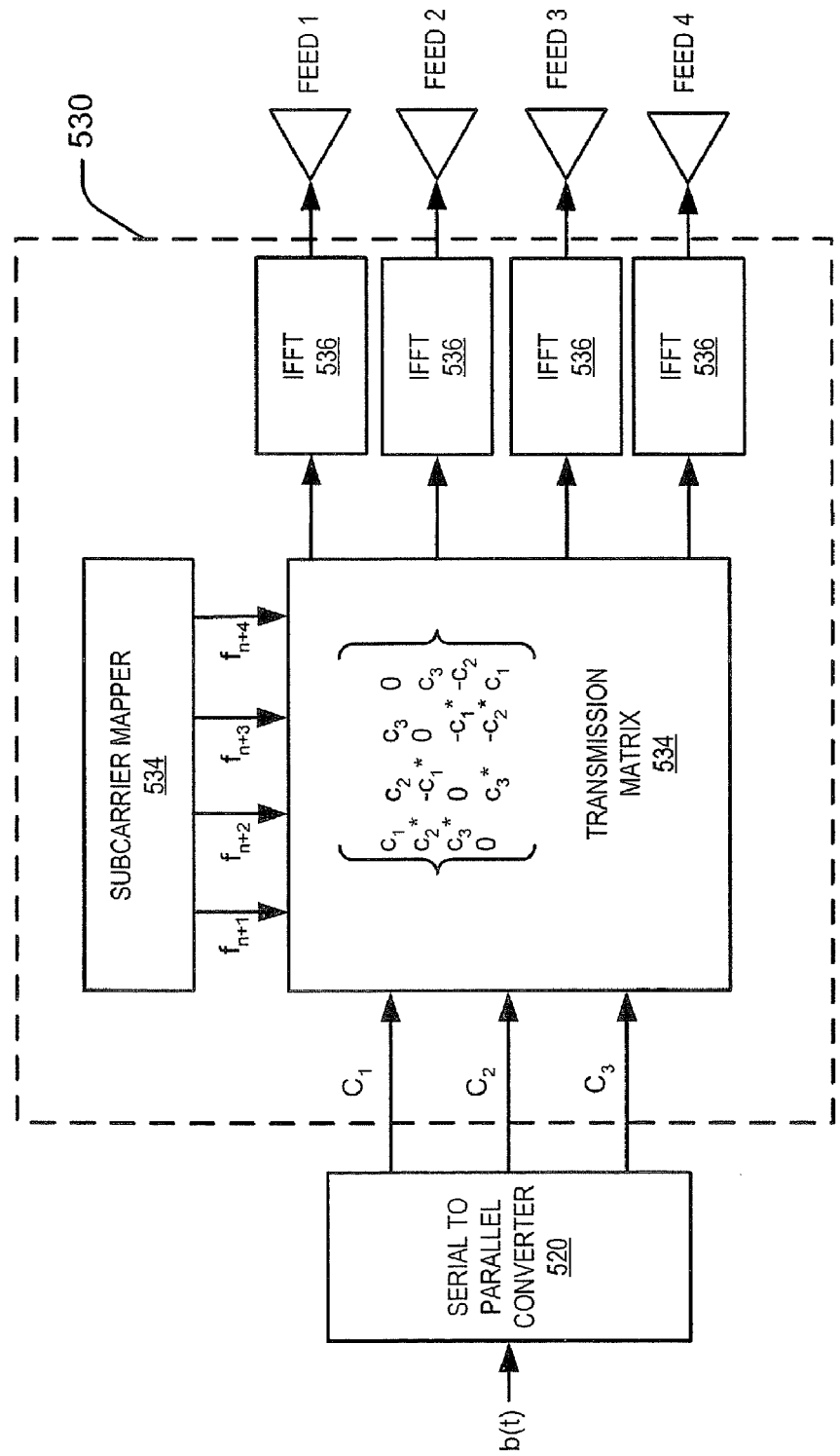
FIG. 7 is a block diagram of space-frequency spreading encoder systems and/or methods according to some embodiments of the invention.

FIG. 7 is a block diagram of a space-frequency encoder 530 according to some embodiments of the invention. In a space-frequency coding transmit system, for example, a set of sub-carrier data streams $c_1$, $c_2$ and $c_3$ are transmitted according to the transmission matrix 532 given by Equation (7), whose columns represent orthogonal sub-carriers and whose rows represent the feed elements as shown in FIG. 7. The orthogonal subcarriers to be used are identified by a subcarrier mapper 534, and the resulting data streams are modulated by inverse fast fourier transform (IFFT) blocks 536 before being transmitted by the feed elements Feed 1 to Feed 4.

Space-frequency encoding essentially involves the transmitted data symbol mapping with transmit 4 feed antennas as shown in Table 2.

TABLE 2

Space-Frequency Encoding Scheme for 4 feeds Transmit Diversity

| Feed | Sub-Carrier | | | |
|---|---|---|---|---|
| | $f_{n+1}$ | $f_{n+2}$ | $f_{n+3}$ | $f_{n+4}$ |
| 1 | $c_1$ | $c_2$ | $c_3$ | 0 |
| 2 | $c_2^*$ | $-c_1^*$ | 0 | $c_3$ |
| 3 | $c_3^*$ | 0 | $-c_1^*$ | $-c_2$ |
| 4 | 0 | $c_3^*$ | $-c_2^*$ | $c_1$ |

The OFDM receiver at the end user receives signals (after Fast Fourier Transform (FFT)) at sub-carriers $f_{n+1}$, $f_{n+2}$, $f_{n+3}$ and $f_{n+4}$ that can be expressed in a similar way as those given in Equation (9). After combining the received signals according to a set of equations similar to Equations (10-12), the decoded sub-carrier signals are obtained with a fourth-order of diversity gain.

The foregoing examples for space-code/time/frequency transmit diversity are based on a complex orthogonal design of four-feed antenna elements. The coding rate is related to the transmission scheme. To make the decoding algorithm simple, and/or to reduce the complexity of the receiver, the complex linear processing orthogonal design provided in some embodiments for transmission with 4 feed antenna elements. Such a transmission scheme has coding rate of 3/4. Theoretically a full rate of complex orthogonal design only exists for 2 antenna transmission. In general, for complex orthogonal design, the greater the number of antennas, the greater the reduction in coding rate.

For satellite forward multiple feed transmission with complex orthogonal design, using 4 feed antennas transmission may provide a good trade-off between performance and complexity. For a given user location, 4 maximum-gain feeds may provide the greater part of the power that can be received by the user. The remaining antenna feed elements may have much lower power levels than is receivable by the user, because of the roll-off nature of feed patterns. Using more than 4 feeds may improve the performance margin to some degree, but may be at the cost of rate reduction and/or increased complexity of the encoder and/or the decoder. For example, a complex orthogonal design for 5 transmit feed elements may require a 5×15 transmission matrix with a coding rate of 2/3 (10/15). On the other hand, embodiments according to the invention can be easily extended to a receiver having more than one receiving antenna. For example, if using N=2 receiving antennas, the same receiver scheme may be used for each antenna, and then simply add the coherently combined signals from two receivers may simply be added together. Using two receiving antennas would double the diversity order of system compared with using a single receiver antenna.

Another factor related to increasing the number of transmitting feed antenna elements may include decoding delay. The decoding delay may only be a concern for the space-time coding but not for the space-code/frequency coding. This is because for the space-time coding, the block encoding is done with a block of symbols. Thus, the decoder has to receive a complete block of information in order to decode the symbols. In the example above, the decoding delay for the space-time coding is 4 symbol intervals. No decoding delay is introduced for both space-code and/or space-frequency coding, because the encoding is done within a symbol.

The diversity gain provided by the space-time block coding with complex orthogonal design may be affected by the feed antenna element balance and/or satellite channel conditions. With respect to feed antenna element balance, the power levels received by a user from each of the involved feed antenna elements should be close, which is very much real for a few (4 in our example) feed antennas being used. Regarding satellite channel conditions, uncorrelated (Rician or Rayleigh) fading channels give the best diversity gain for the transmission scheme. The satellite channel is more likely a flat Rician channel, and the correlation between channels may also be dependent on the physical spacing of the feed antenna elements being involved.

A transmission scheme according to some embodiments of the invention simultaneously transmits signals from multiple feed elements. Since the total transmitted power may be divided equally among four feeds, the transmit scheme may not introduce additional interference. Like a fixed spot beam, the inter-cell interference may be limited by proper frequency planning and/or the roll-off nature of feed patterns.

The space-time block coding diversity transmission may be extended for space-polarization block coding with both left hand and right hand polarization components. It may also be possible to combine both space-time block coding and fixed spot-beam forming to take advantage of both techniques. However, unlike the space-time block coding transmission scheme, which is an open-loop approach, beamforming generally requires closed-loop calibration.

The performance of a satellite transmit system according to some embodiments of the invention may be evaluated with computer simulations. In order to compare performance of the new transmission schemes with that of fixed spot beamforming, satellite transmission feed element gain and phase data, as well as the formed fixed spot beam data provided by a major satellite manufacturer may be used. An exemplary forward transmit system may have 4 transmit feeds and 1 or 2 receive antenna(s) in the open-loop mode. For fixed spot beamforming, which is not dependent on the user waveform, the forward transmit system uses 62 feeds and 1 receive antenna.

To provide a fair comparison among different transmission schemes, fixed spot beamforming is used as a benchmark, i.e., all involved feed element gains are accordingly scaled with the peak gain of the fixed spot-beam being scaled to 1 (0 dB). The large scale propagation channel path loss is assumed to be 0 dB. The satellite channel is assumed to be a Rician distributed fading channel with a line-of-sight (LOS) component plus independent fading components from each transmit feed to the receive antenna. The Rician K-factor is defined as the ratio of the LOS component and the fading components. The total transmit power (at the output of the hybrid matrices) is further assumed to be constrained to unity for all transmit schemes under consideration. In other words, the total transmit power is set to be the same, no matter which transmit scheme is used. In all simulations, $E_b/N_o$ is defined as the received signal-to-noise ratio at the CPE receiver for the fixed spot-beam scheme.

Figure 8:
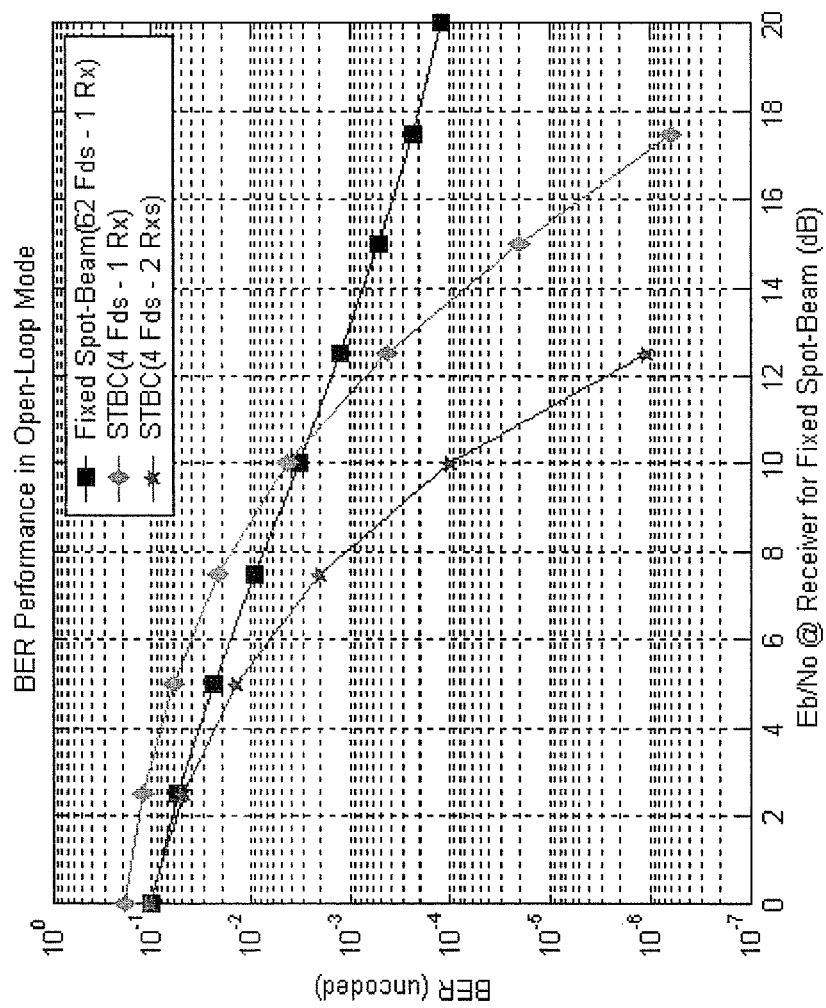
FIG. 8 is a graph of simulation results showing simulated performance of multiple feed space-code diversity transmitter systems and/or methods according to some embodiments of the invention.

FIG. 8 shows the performance of a transmit diversity system in the open-loop mode and the fixed spot-beam in a Rician channel with K-factor=7 dB. The fixed spot-beam outperforms the space-time block code (STBC) diversity scheme when the user terminal uses antenna for both schemes and $E_b/N_o$ is low. As $E_b/N_o$ increases, the diversity transmit scheme overtakes the fixed spot-beam. The performance difference may be due to the fact that STBC only provides diversity gain, while the fixed spot-beam only yields beamforming gain. The more channel fading there is, the more diversity gain, and the less beamforming gain. When $E_b/N_o$ is low, the noise factor affects the diversity gain with STBC more than it does the beamforming gain with a fixed spot-beam. When noise decreases, the diversity gain becomes more dominant than fixed beamforming gain. The STBC open-loop transmit diversity system can be easily extended to 2 antennas at the CPE terminal, whose performance is also provided in the figure.

Further embodiments of the invention are shown in FIG. 9, which schematically illustrates an exemplary footprint of five satellite forward link feed elements A1 to A5 from a first satellite that are superimposed over a virtual cell configuration including nine virtual cells 1-9 for a satellite transmit diversity system. In addition, in FIG. 9, the footprints of four antenna feed elements B1 to B5 from a second satellite are also transposed over the nine virtual cells.

For an open-loop transmit diversity system according to some embodiments of the invention, a subset of M feed elements of the first satellite antenna and the second satellite antenna are chosen based on the order of most visible to the users in the cell. Thus, for example, in the embodiments shown in FIG. 1, feed elements A1, A2, B3 and B4 may be most visible to users in cell 4. According to some embodiments of the invention, a transmit data stream for a user in a cell may be block coded as described above and transmitted to the user from a first subset of feed elements on a first satellite antenna and a second subset of feed elements on a second satellite antenna.

Figure 10:
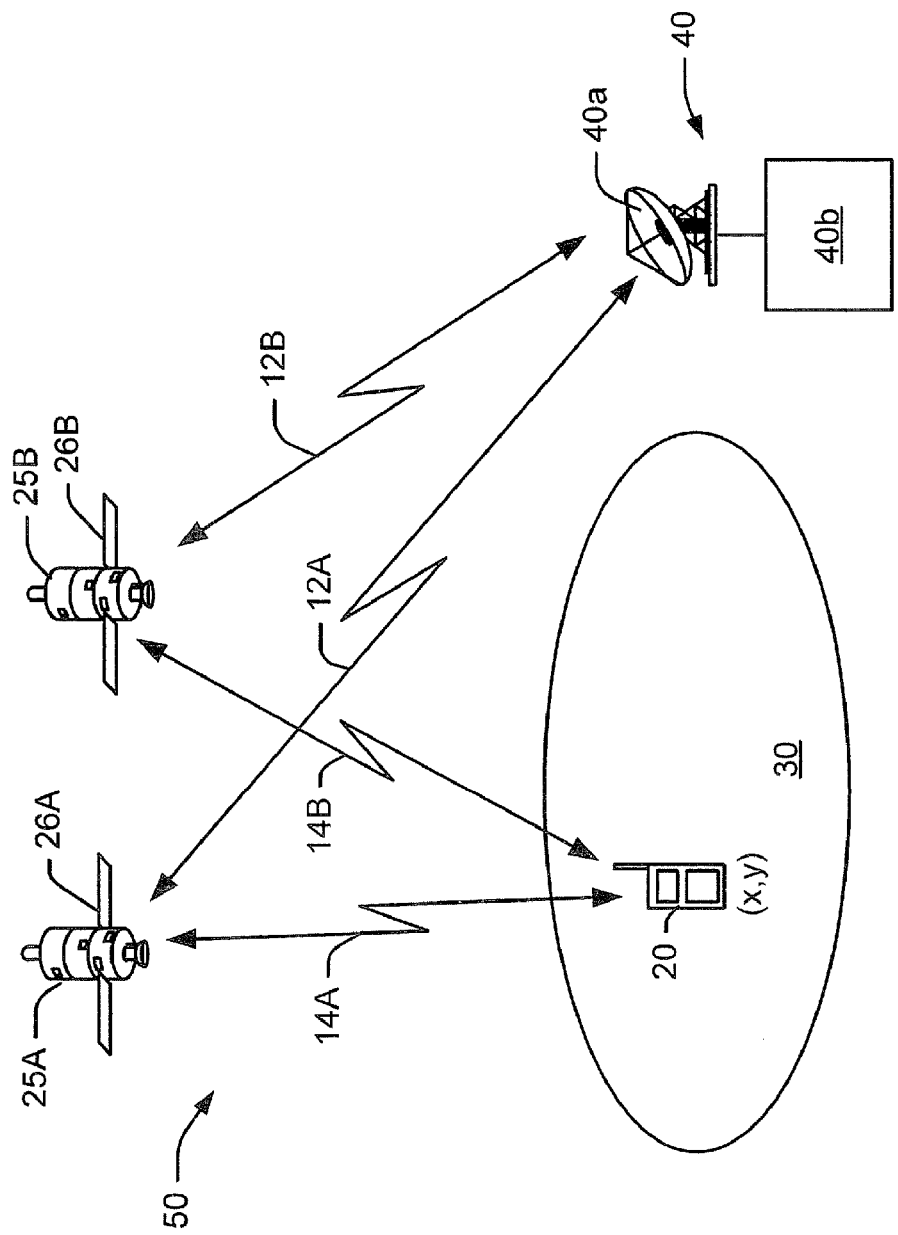
FIG. 10 is a schematic diagram illustrating a two satellite diversity systems in which first and second satellites communicate with one gateway via first and second feeder links.

A system/method 50 according to further embodiments of the invention is illustrated in FIG. 10. As shown therein, a wireless terminal 30 is located in a geographic cell based on the geographic (x,y) coordinates of the wireless terminal 20. The geographic coordinates of the wireless terminal 20 may be determined, for example, by a GPS processor within the wireless terminal 20. The wireless terminal is also located within the geographic footprints of a first satellite 25A and a second satellite 25B, which may be low-earth orbiting satellites (LEO) medium-earth orbiting satellites (MEO), and/or geostationary satellites. The first and second satellites 25A, 25B communicate with at least one gateway 40, which includes an antenna 40a and an electronics system 40b via first and second feeder links 12A, 12B.

The wireless terminal 20 may determine its geographic coordinates, and may transmit the geographic coordinates to the satellite gateway 40 via a return link communications channel carried by a service link 14A to the first satellite 25A and/or a service link 14B to the second satellite 25B. Based on the location of the wireless terminal 20, the satellite gateway 40 may select a plurality of feed elements at the first satellite 25A and a plurality of feed elements at the second satellite 25B for use in transmitting signals to the wireless terminal, as described above. Thus, the M feed elements used for transmitting signals to the wireless terminal 20 may be distributed between the first satellite 25A and the second satellite 25B.

In order to transmit a signal to the wireless terminal 20, the satellite gateway 40 may construct a plurality of parallel block coded signals, such as the signals described above with reference to Equations (14) to (17) for space-code encoding. The various signals may be sent by the satellite gateway 40 to the corresponding satellite 25A, 25B for transmission to the wireless terminal 20. Thus, for example, the satellite gateway 40 may determine that two feed elements from satellite 25A and two feed elements from satellite 25B should be used to send a signal to the wireless terminal 20. The satellite gateway 40 may then construct four transmit signals, such as the four space-code encoded transmit signals defined above in Equations (14) to (17). Two of the encoded transmit signals may be sent to the first satellite 25A via the feeder link 12A, and two of the encoded transmit signals may be sent to the second satellite 25B via the feeder link 12B. The encoded transmit signals may be transmitted by the satellites 25A, 25B using the appropriate feed elements as indicated by the satellite gateway 40 to the wireless terminal 20.

The distances from the first satellite 25A and the second satellite 25B to the satellite gateway 40 and/or the wireless terminal 20 may be substantially different, and, accordingly, the feeder links 12A, 12B and/or the service links 14A, 14B may have significantly different propagation delays. One or more of the signals transmitted by the satellite gateway 40 to the first and second satellites 25A, 25B may be selectively delayed to account for differences in the propagation delays between the first and second feeder links 12A, 12B and/or the first and second service links 14A, 14B, respectively, such that the signals transmitted by the first and second satellites 25A, 25B arrive at the wireless terminal 20 within a coherence time of a receiver in the wireless terminal 20. Propagation delays may be determined by the satellite gateway 40 based on the relative positions of the gateway 40, the wireless terminal 20, and the first and second satellites 25A, 25B.

Methods and system architectures for open-loop satellite forward link transmission are described. An open-loop transmit diversity scheme as described herein can improve system performance, particularly in the fading channel environments. Some embodiments of the invention provide methods of generating a satellite forward service link beam including, in an open loop mode, encoding a signal using space-time, space-code, and/or space-frequency block coding and transmitting the encoded signal over multiple feed elements. Embodiments of the invention provide systems and apparatus, including satellites/gateways and associated devices, configured to perform open loop forward service link transmission.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of transmitting communications signals from a satellite to a wireless terminal, comprising:
   determining a location of the wireless terminal;
   selecting a plurality of antenna feed elements at the satellite in response to the determined location of the wireless terminal;
   block coding a plurality of symbols into a number of transmit streams equal to the number of selected antenna feed elements wherein block coding the plurality of symbols comprises space-code encoding the plurality of symbols; and
   transmitting the transmit streams over the selected plurality of antenna feed elements;
   generating a plurality of extended pseudonoise codes $w_L$ based on a pseudonoise code w associated with the wireless terminal, wherein the extended pseudonoise codes $w_L$ have a length that is m-times longer than the pseudonoise code w;
   repeating the symbols m times; and
   constructing a transmission matrix using the repeated symbols;
   wherein block coding the transmit streams comprises combining the extended pseudonoise codes with the transmission matrix; and
   wherein the transmission matrix has a form such that the product of the transmission matrix and its transpose conjugate is equal to the sum of the squares of the plurality of symbols used to generate the transmission matrix multiplied by a diagonal unity matrix.

2. The method of claim 1, further comprising demultiplexing an information signal to provide the plurality of symbols.

3. The method of claim 1, further comprising selecting a transmit frequency in response to the location of the wireless terminal, wherein transmitting the transmit streams comprises transmitting the transmit streams over the selected transmit frequency.

4. The method of claim 1, wherein determining the location of the wireless terminal comprises receiving an indication of the location of the wireless terminal from the wireless terminal over a return link frequency.

5. The method of claim 1, wherein space-code encoding the plurality of symbols comprises generating a transmission matrix using the plurality of symbols and combining the transmission matrix with a plurality of pseudonoise codes to generate the transmit streams.

6. The method of claim 1, wherein the pseudonoise code w comprises a Walsh code, and wherein generating the extended pseudonoise codes comprises generating extended Walsh codes.

7. The method of claim 6, wherein generating the extended Walsh codes comprises constructing a matrix M from the Walsh code having the following form:

$$\begin{bmatrix} w & w & w & w \\ w & -w & w & -w \\ w & w & -w & w \\ w & w & -w & w \end{bmatrix}$$

wherein the rows of the matrix M represent the extended Walsh codes.

8. The method of claim 1, wherein the number of selected antenna feed elements is four, and wherein the transmission matrix has the form:

$$\begin{bmatrix} c_1 & c_2 & c_3 & 0 \\ c_2^* & -c_1^* & 0 & c_3 \\ c_3^* & 0 & -c_1^* & -c_2 \\ 0 & c_3^* & -c_2^* & c_1 \end{bmatrix}$$

wherein $c_1$, $c_2$ and $c_3$ represent the plurality of symbols.

9. The method of claim 1, wherein selecting a plurality of feed elements at the satellite comprises selecting a first feed element at a first satellite and selecting a second feed element at a second satellite, and wherein transmitting the transmit streams over the selected plurality of feed elements comprises transmitting a first of the transmit streams to the wireless terminal from the first feed element at the first satellite and transmitting a second of the transmit streams to the wireless terminal from the second feed element at the second satellite.

10. The method of claim 9, further comprising:
    determining a difference in propagation delay between the first and second satellites and the wireless terminal; and
    selectively delaying the first or second transmit stream by a delay time in response to the determined difference in propagation delay.

11. The method of claim 10, wherein the delay time is selected such that signals transmitted by the first and second satellites arrive at the wireless terminal within a coherence time of a receiver in the wireless terminal.

12. The method of claim 1, wherein block coding the plurality of symbols comprises space-time encoding the plurality of symbols.

13. The method of claim 12, wherein space-time encoding the plurality of symbols comprises generating a transmission matrix using the plurality of symbols, and wherein transmitting the transmit streams over the selected plurality of antenna feed elements comprises transmitting the transmit streams at time intervals specified by a time scheduler.

14. The method of claim 13, wherein the number of selected antenna feed elements is four, and wherein the transmission matrix has the form:

$$\begin{bmatrix} c_1 & c_2 & c_3 & 0 \\ c_2^* & -c_1^* & 0 & c_3 \\ c_3^* & 0 & -c_1^* & -c_2 \\ 0 & c_3^* & -c_2^* & c_1 \end{bmatrix}$$

wherein $c_1$, $c_2$ and $c_3$ represent the plurality of symbols.

15. The method of claim 13, wherein the transmission matrix has a form such that the product of the transmission matrix and its transpose conjugate is equal to the sum of the squares of the plurality of symbols used to generate the transmission matrix multiplied by a diagonal unity matrix.

16. The method of claim 1, wherein block coding the plurality of symbols comprises space-frequency encoding the plurality of symbols.

17. The method of claim 16, wherein space-frequency encoding the plurality of symbols comprises generating a transmission matrix using the plurality of symbols, and wherein transmitting the transmit streams over the selected plurality of antenna feed elements comprises transmitting the transmit streams over orthogonal subcarriers.

18. The method of claim 17, wherein the number of selected antenna feed elements is four, and wherein the transmission matrix has the form:

$$\begin{bmatrix} c_1 & c_2 & c_3 & 0 \\ c_2^* & -c_1^* & 0 & c_3 \\ c_3^* & 0 & -c_1^* & -c_2 \\ 0 & c_3^* & -c_2^* & c_1 \end{bmatrix}$$

wherein $c_1$, $c_2$ and $c_3$ represent the plurality of symbols.

19. The method of claim 17, wherein the transmission matrix has a form such that the product of the transmission matrix and its transpose conjugate is equal to the sum of the squares of the plurality of symbols used to generate the transmission matrix multiplied by a diagonal unity matrix.

20. A satellite configured to transmit communications signals to a wireless terminal, comprising:

an antenna including a plurality of feed elements;

a controller configured to obtain a location of the wireless terminal and configured to select a plurality of the antenna feed elements in response to the obtained location of the wireless terminal, and configured to block code a plurality of symbols into a number of transmit streams equal to the number of selected antenna feed elements wherein the controller is configured to block code the plurality of symbols by space-time encoding the plurality of symbols;

a transmitter configured to transmit the transmit streams over the selected plurality of antenna feed elements; and a time scheduler;

wherein the controller is configured to generate a transmission matrix using the plurality and wherein the transmitter is configured to transmit the transmit streams over the selected plurality of antenna feed elements at time intervals specified by the time scheduler; and wherein the number of selected antenna feed elements is four, and wherein the transmission matrix has the form:

$$\begin{bmatrix} c_1 & c_2 & c_3 & 0 \\ c_2^* & -c_1^* & 0 & c_3 \\ c_3^* & 0 & -c_1^* & -c_2 \\ 0 & c_3^* & -c_2^* & c_1 \end{bmatrix}$$

wherein $c_1$, $c_2$ and $c_3$ represent the plurality of symbols.

21. The satellite of claim 20, wherein the controller is further configured to demultiplex an information signal to provide the plurality of symbols.

22. The satellite of claim 20, wherein the controller is further configured to select a transmit frequency in response to the location of the wireless terminal, and wherein the transmitter is further configured to transmit the transmit streams over the selected transmit frequency.

23. The satellite of claim 20, wherein the controller is configured to receive an indication of the location of the wireless terminal from the wireless terminal over a return link frequency.

24. The satellite of claim 20, wherein the controller is configured to block code the plurality of symbols by space-code encoding the plurality of symbols.

25. The satellite of claim 24, wherein the controller is configured to space-code encode the plurality of symbols by generating a transmission matrix using the plurality of symbols and combining the transmission matrix with a plurality of pseudonoise codes to generate the transmit streams.

26. The satellite of claim 24, wherein the controller is configured to generate a plurality of extended pseudonoise codes $w_L$ based on a pseudonoise code w associated with the wireless terminal, wherein the extended pseudonoise codes $w_L$ have a length that is m-times longer than the pseudonoise code w.

27. The satellite of claim 26, wherein the controller is further configured to repeat the symbols m times, to construct a transmission matrix using the repeated symbols, and to combine the extended pseudonoise codes with the transmission matrix to generate the transmit streams.

28. The satellite of claim 27, wherein the pseudonoise code w comprises a Walsh code, and wherein the extended pseudonoise codes comprise extended Walsh codes.

29. The satellite of claim 28, wherein the extended Walsh codes comprises a matrix M having the form:

$$\begin{bmatrix} w & w & w & w \\ w & -w & w & -w \\ w & w & -w & w \\ w & w & -w & w \end{bmatrix}$$

wherein the rows of the matrix M represent the extended Walsh codes.

30. The satellite of claim 27, wherein the number of selected antenna feed elements is four, and wherein the transmission matrix has the form:

$$\begin{bmatrix} c_1 & c_2 & c_3 & 0 \\ c_2^* & -c_1^* & 0 & c_3 \\ c_3^* & 0 & -c_1^* & -c_2 \\ 0 & c_3^* & -c_2^* & c_1 \end{bmatrix}$$

wherein $c_1$, $c_2$ and $c_3$ represent the plurality of symbols.

31. The satellite of claim 20, wherein the controller is configured to block code the plurality of symbols by space-frequency encoding the plurality of symbols.

32. The satellite of claim 31, wherein the controller is further configured to generate a transmission matrix using the plurality of symbols, and wherein the transmitter is configured to transmit the transmit streams over orthogonal subcarriers.

33. The satellite of claim 32, wherein the number of selected antenna feed elements is four, and wherein the transmission matrix has the form:

$$\begin{bmatrix} c_1 & c_2 & c_3 & 0 \\ c_2^* & -c_1^* & 0 & c_3 \\ c_3^* & 0 & -c_1^* & -c_2 \\ 0 & c_3^* & -c_2^* & c_1 \end{bmatrix}$$

wherein $c_1$, $c_2$ and $c_3$ represent the plurality of symbols.

34. A satellite gateway configured to transmit communications signals to a wireless terminal via a satellite including an antenna having a plurality of feed elements, comprising:
- a controller configured to obtain a location of the wireless terminal and configured to select a plurality of the antenna feed elements in response to the obtained location of the wireless terminal and configured to block code a plurality of symbols into a number of transmit streams equal to the number of selected antenna feed elements wherein the controller is configured to block code the plurality of symbols by space-time encoding the plurality of symbols;
- a transmitter configured to transmit the transmit streams to the satellite for transmission over the selected plurality of antenna feed elements; and
- a time scheduler;
- wherein the controller is configured to generate a transmission matrix using the plurality of symbols, and wherein the transmitter is configured to transmit the transmit streams over the selected plurality of antenna feed elements at time intervals specified by the time scheduler; and
- wherein the number of selected antenna feed elements is four, and wherein the transmission matrix has the form:

$$\begin{bmatrix} c_1 & c_2 & c_3 & 0 \\ c_2^* & -c_1^* & 0 & c_3 \\ c_3^* & 0 & -c_1^* & -c_2 \\ 0 & c_3^* & -c_2^* & c_1 \end{bmatrix}$$

wherein $c_1$, $c_2$ and $c_3$ represent the plurality of symbols.

35. The satellite gateway of claim 34, wherein the controller is further configured to demultiplex an information signal to provide the plurality of symbols.

36. The satellite gateway of claim 34, wherein the controller is configured to receive an indication of the location of the wireless terminal from the wireless terminal.

37. The satellite gateway of claim 34, wherein the controller is configured to block code the plurality of symbols by space-code encoding the plurality of symbols.

38. The satellite gateway of claim 37, wherein the controller is configured to space-code encode the plurality of symbols by generating a transmission matrix using the plurality of symbols and combining the transmission matrix with a plurality of pseudonoise codes to generate the transmit streams.

39. The satellite gateway of claim 37, wherein the controller is configured to generate a plurality of extended pseudonoise codes $w_L$ based on a pseudonoise code w associated with the wireless terminal, wherein the extended pseudonoise codes $w_L$ have a length that is m-times longer than the pseudonoise code w.

40. The satellite gateway of claim 39, wherein the controller is further configured to repeat the symbols m times, to construct a transmission matrix using the repeated symbols, and to combine the extended pseudonoise codes with the transmission matrix to generate the transmit streams.

41. The satellite gateway of claim 40, wherein the pseudonoise code w comprises a Walsh code, and wherein the extended pseudonoise codes comprise extended Walsh codes.

42. The satellite gateway of claim 41, wherein the extended Walsh codes comprises a matrix M having the form:

$$\begin{bmatrix} w & w & w & w \\ w & -w & w & -w \\ w & w & -w & w \\ w & w & -w & w \end{bmatrix}$$

wherein the rows of the matrix M represent the extended Walsh codes.

43. The satellite gateway of claim 40, wherein the number of selected antenna feed elements is four, and wherein the transmission matrix has the form:

$$\begin{bmatrix} c_1 & c_2 & c_3 & 0 \\ c_2^* & -c_1^* & 0 & c_3 \\ c_3^* & 0 & -c_1^* & -c_2 \\ 0 & c_3^* & -c_2^* & c_1 \end{bmatrix}$$

wherein $c_1$, $c_2$ and $c_3$ represent the plurality of symbols.

44. The satellite gateway of claim 34, wherein the controller is configured to block code the plurality of symbols by space-frequency encoding the plurality of symbols.

45. The satellite gateway of claim 44, wherein the controller is further configured to generate a transmission matrix using the plurality of symbols, and wherein the transmitter is configured to transmit the transmit streams over orthogonal subcarriers.

46. The satellite gateway of claim 45, wherein the number of selected antenna feed elements is four, and wherein the transmission matrix has the form:

$$\begin{bmatrix} c_1 & c_2 & c_3 & 0 \\ c_2^* & -c_1^* & 0 & c_3 \\ c_3^* & 0 & -c_1^* & -c_2 \\ 0 & c_3^* & -c_2^* & c_1 \end{bmatrix}$$

wherein $c_1$, $c_2$ and $c_3$ represent the plurality of symbols.

47. The satellite gateway of claim 34, wherein the satellite comprises a first satellite, and wherein the controller is further configured to select a first feed element at the first satellite and to select a second feed element at a second satellite, and wherein the transmitter is configured to transmit a first of the transmit streams to the first satellite for transmission to the wireless terminal from the first feed element at the first satellite and to transmit a second of the transmit streams to the second satellite for transmission to the wireless terminal from the second feed element at the second satellite.

48. The satellite gateway of claim 47, wherein the controller is further configured to determine a difference in propagation delay between the first and second satellites and the wireless terminal, and to selectively delay the first or second transmit stream by a delay time in response to the determined difference in propagation delay.

49. The satellite gateway of claim 48, wherein the delay time is selected such that signals transmitted by the first and second satellites arrive at the wireless terminal within a coherence time of a receiver in the wireless terminal.

50. A satellite communications system, comprising:
a satellite including an antenna having a plurality of antenna feed elements; and
a satellite gateway comprising:
a controller configured to obtain a location of a wireless terminal within a geographic footprint of the satellite, and configured to select a plurality of the antenna feed elements in response to the obtained location of the wireless terminal and configured to block code a plurality of symbols into a number of transmit streams equal to the number of selected antenna feed elements wherein the controller is configured to block code the plurality of symbols by space-time encoding the plurality of symbols; and
a transmitter configured to transmit the transmit streams to the satellite for transmission over the selected plurality of antenna feed elements; and
a time scheduler;
wherein the controller is configured to generate a transmission matrix using the plurality of symbols, and wherein the transmitter is configured to transmit the transmit streams over the selected plurality of antenna feed elements at time intervals specified by the time scheduler; and
wherein the number of selected antenna feed elements is four, and wherein the transmission matrix has the form:

$$\begin{bmatrix} c_1 & c_2 & c_3 & 0 \\ c_2^* & -c_1^* & 0 & c_3 \\ c_3^* & 0 & -c_1^* & -c_2 \\ 0 & c_3^* & -c_2^* & c_1 \end{bmatrix}$$

wherein $c_1$, $c_2$ and $c_3$ represent the plurality of symbols.

51. The satellite communications system of claim 50, wherein the controller is further configured to demultiplex an information signal to provide the plurality of symbols.

52. The satellite communications system of claim 50, wherein the controller is configured to receive an indication of the location of the wireless terminal from the wireless terminal.

53. The satellite communications system of claim 50, wherein the controller is configured to block code the plurality of symbols by space-code encoding the plurality of symbols.

54. The satellite communications system of claim 53, wherein the controller is configured to space-code encode the plurality of symbols by generating a transmission matrix using the plurality of symbols and combining the transmission matrix with a plurality of pseudonoise codes to generate the transmit streams.

55. The satellite communications system of claim 53, wherein the controller is configured to generate a plurality of extended pseudonoise codes $w_L$ based on a pseudonoise code w associated with the wireless terminal, wherein the extended pseudonoise codes $w_L$ have a length that is m-times longer than the pseudonoise code w.

56. The satellite communications system of claim 55, wherein the controller is further configured to repeat the symbols m times, to construct a transmission matrix using the repeated symbols, and to combine the extended pseudonoise codes with the transmission matrix to generate the transmit streams.

57. The satellite communications system of claim 56, wherein the pseudonoise code w comprises a Walsh code, and wherein the extended pseudonoise codes comprise extended Walsh codes.

58. The satellite communications system of claim 50, wherein the controller is configured to block code the plurality of symbols by space-time encoding the plurality of symbols.

59. The satellite communications system of claim 58, further comprising a time scheduler, wherein the controller is configured to generate a transmission matrix using the plurality of symbols, and wherein the transmitter is configured to transmit the transmit streams over the selected plurality of antenna feed elements at time intervals specified by the time scheduler.

60. The satellite communications system of claim 50, wherein the controller is configured to block code the plurality of symbols by space-frequency encoding the plurality of symbols.

61. The satellite communications system of claim 60, wherein the controller is further configured to generate a transmission matrix using the plurality of symbols, and wherein the transmitter is configured to transmit the transmit streams over orthogonal subcarriers.

62. The satellite communications system of claim 50, wherein the satellite comprises a first satellite, the system further comprising a second satellite comprising an antenna having a plurality of antenna feed elements;
wherein the controller is further configured to select a first feed element at the first satellite and to select a second feed element at the second satellite, and wherein the transmitter is configured to transmit a first of the transmit streams to the first satellite for transmission to the wireless terminal from the first feed element at the first satellite and to transmit a second of the transmit streams to the second satellite for transmission to the wireless terminal from the second feed element at the second satellite.

63. The satellite communications system of claim 62, wherein the controller is further configured to determine a difference in propagation delay between the first and second satellites and the wireless terminal, and to selectively delay the first or second transmit stream by a delay time in response to the determined difference in propagation delay.

64. The satellite communications system of claim 63, wherein the delay time is selected such that signals transmitted by the first and second satellites arrive at the wireless terminal within a coherence time of a receiver in the wireless terminal.

* * * * *

UNITED STATES PATENT AND TRADEMARK OFFICE
CERTIFICATE OF CORRECTION

| | |
|---|---|
| PATENT NO. | : 7,979,024 B2 |
| APPLICATION NO. | : 11/624495 |
| DATED | : July 12, 2011 |
| INVENTOR(S) | : Zheng |

It is certified that error appears in the above-identified patent and that said Letters Patent is hereby corrected as shown below:

In the Patent:

Column 5, Line 41: Please correct "$C_3$" to read -- $c_3$ --

Column 14, Line 29: Please correct "$C_3$" to read -- $c_3$ --

Line 36: Please correct "$C_3$*" to read -- $c_3$* --

Line 38: Please correct "-$C_2$" to read -- -$c_2$ --

Line 39: Please correct "$C_3$*" to read -- $c_3$* -- and correct "-$C_2$*" to read -- $c_2$* --

(8), Line 43: Please correct "$c^H c=$" to read -- $C^H C=$ --

Column 15, (10), Line 16: Please correct $$\sqrt{\frac{P}{4}}|h_{4,1}|^2 c_1 - \sqrt{\frac{P}{4}} h^*_{4,1}$$

to read $$+\sqrt{\frac{P}{4}}|h_{4,1}|^2 c_1 + \sqrt{\frac{P}{4}} h^*_{4,1}$$

In the Claims:

Column 24, Claim 1, Line 38: Please delete "and"

Column 25, Claim 20, Line 62: Please correct "the plurality and wherein"
to read -- the plurality of symbols and wherein --

Signed and Sealed this
Seventh Day of February, 2012

David J. Kappos
*Director of the United States Patent and Trademark Office*